US012634955B2

(12) United States Patent
Dai et al.

(10) Patent No.: US 12,634,955 B2
(45) Date of Patent: May 19, 2026

(54) COMMON CONTROL CHANNEL

(71) Applicant: QUALCOMM Incorporated, San Diego, CA (US)

(72) Inventors: Jing Dai, Beijing (CN); Chao Wei, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 18/254,070

(22) PCT Filed: Jan. 7, 2021

(86) PCT No.: PCT/CN2021/070635
    § 371 (c)(1),
    (2) Date: May 23, 2023

(87) PCT Pub. No.: WO2022/147710
    PCT Pub. Date: Jul. 14, 2022

(65) Prior Publication Data
    US 2023/0422270 A1      Dec. 28, 2023

(51) Int. Cl.
    H04L 5/00        (2006.01)
    H04L 1/00        (2006.01)
    H04W 72/232      (2023.01)

(52) U.S. Cl.
    CPC ......... H04W 72/232 (2023.01); H04L 5/0053 (2013.01)

(58) Field of Classification Search
    CPC .... H04W 72/232; H04L 5/0053; H04L 5/001; H04L 5/0094; H04L 5/0097
    See application file for complete search history.

(56) References Cited

U.S. PATENT DOCUMENTS

| | | | |
|---|---|---|---|
| 10,904,871 B2 | 1/2021 | Yang et al. | |
| 2019/0268206 A1 | 8/2019 | Yang et al. | |
| | | (Continued) | |

FOREIGN PATENT DOCUMENTS

| | | |
|---|---|---|
| CN | 110430031 A | 11/2019 |
| CN | 110741594 A | 1/2020 |
| | (Continued) | |

OTHER PUBLICATIONS

3GPP TSG-RAN WG1#88, R1-1703287 Title:On Control Rresource Seats and Search Space (Year: 2017).*

(Continued)

*Primary Examiner* — Faruk Hamza
*Assistant Examiner* — Abusayeed M Haque
(74) *Attorney, Agent, or Firm* — Dinsmore & Shohl-Qualcomm

(57) ABSTRACT

Various aspects of the present disclosure generally relate to wireless communication. In some aspects, a user equipment (UE) may receive common downlink control information (DCI) included in a physical downlink control channel (PDCCH) candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level. The UE may communicate based at least in part on the common DCI. Numerous other aspects are described.

28 Claims, 12 Drawing Sheets

900 ➔

910 ┤ Receive common DCI included in a PDCCH candidate, wherein the PDCCH candidate has a first size associated with a first aggregation level, wherein the common DCI is detectable at the first aggregation level by decoding the PDCCH candidate and detectable at a second aggregation level by decoding a part of the PDCCH candidate, and wherein the part of the PDCCH candidate has a second size associated with the second aggregation level 920 ┤ Communicate based at least in part on the common DCI

(56)                          References Cited

U.S. PATENT DOCUMENTS

| 2020/0008180 A1* | 1/2020 | Jo | .................. H04L 5/0053 |
| 2020/0296698 A1 | 9/2020 | Kwak et al. | |
| 2021/0143943 A1* | 5/2021 | Zhou | .............. H04W 72/0453 |
| 2021/0144718 A1* | 5/2021 | Jyothi | ............... H04W 72/53 |

FOREIGN PATENT DOCUMENTS

| CN | 111435897 A | 7/2020 |
| WO | 2019108623 | 6/2019 |

OTHER PUBLICATIONS

Supplementary European Search Report—EP21916768—Search Authority—The Hague—Aug. 30, 2024.

International Search Report and Written Opinion—PCT/CN2021/070635—ISA/EPO—Sep. 26, 2021.

Ericsson: "On PDCCH, PUCCH and PUSCH Enhancements with Multiple TRPs", 3GPP TSG-RAN WG1 Meeting #103, R1-2009223, eMeeting, Oct. 26-Nov. 13, 2020, pp. 1-23, Nov. 1, 2020.

* cited by examiner

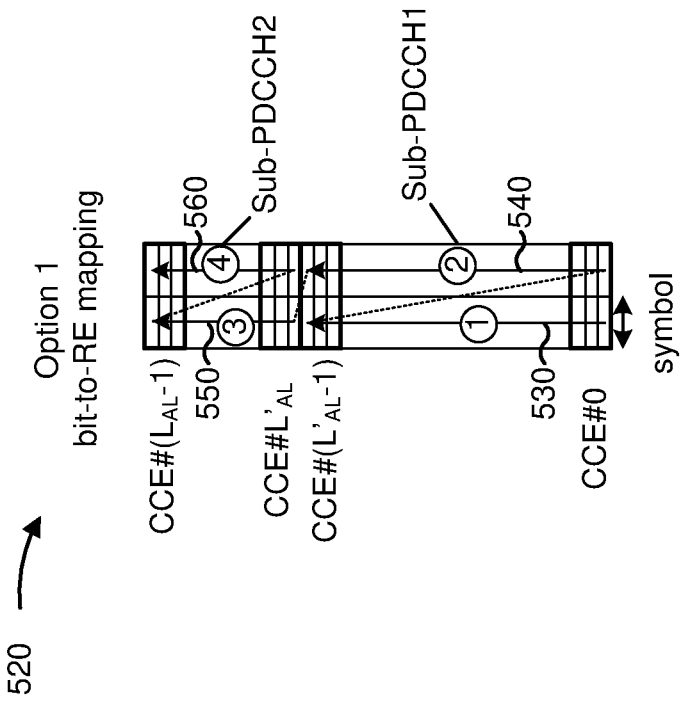
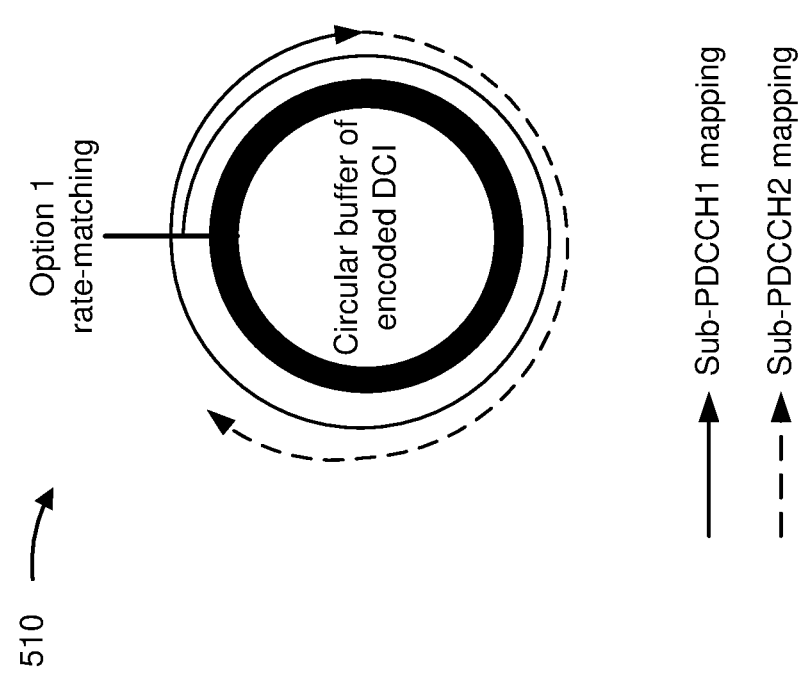
FIG. 5

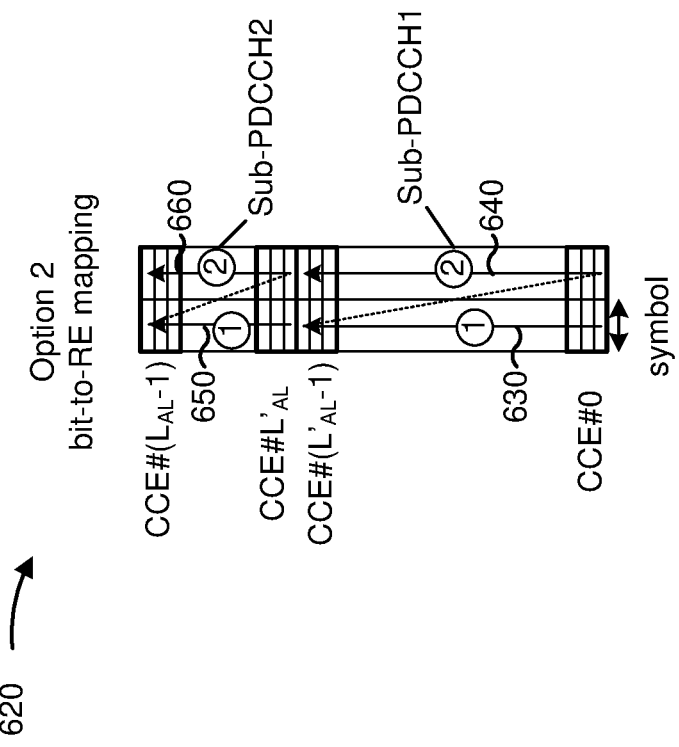
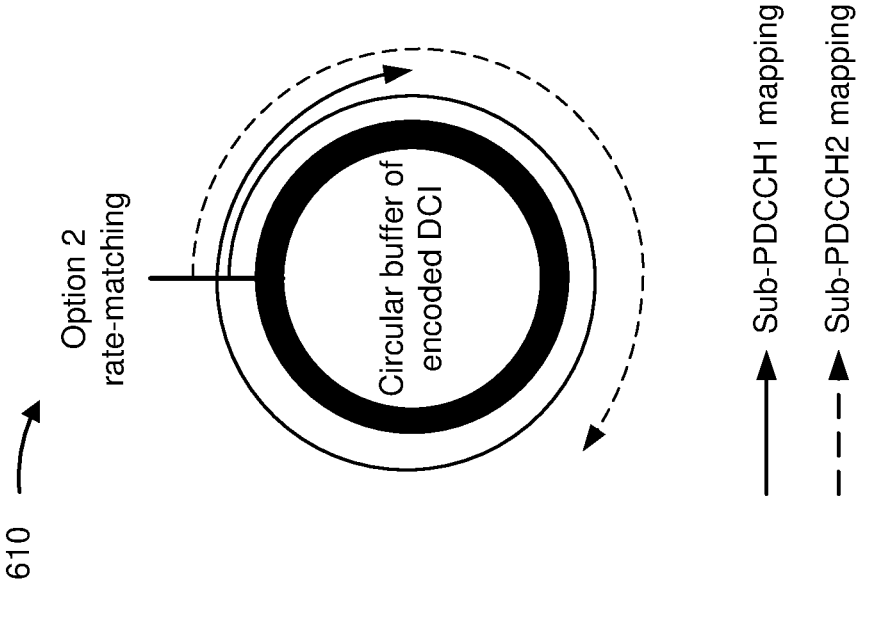
FIG. 6

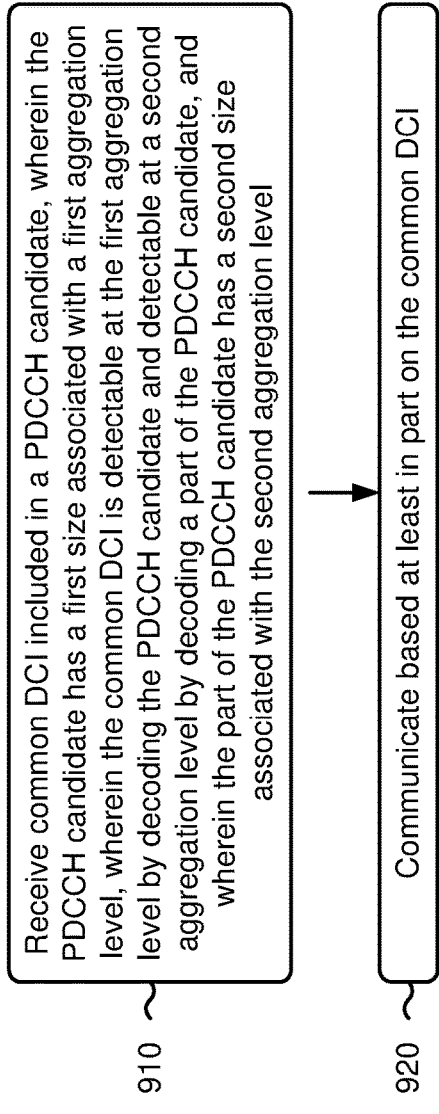

900

910 Receive common DCI included in a PDCCH candidate, wherein the PDCCH candidate has a first size associated with a first aggregation level, wherein the common DCI is detectable at the first aggregation level by decoding the PDCCH candidate and detectable at a second aggregation level by decoding a part of the PDCCH candidate, and wherein the part of the PDCCH candidate has a second size associated with the second aggregation level 920 Communicate based at least in part on the common DCI

FIG. 9

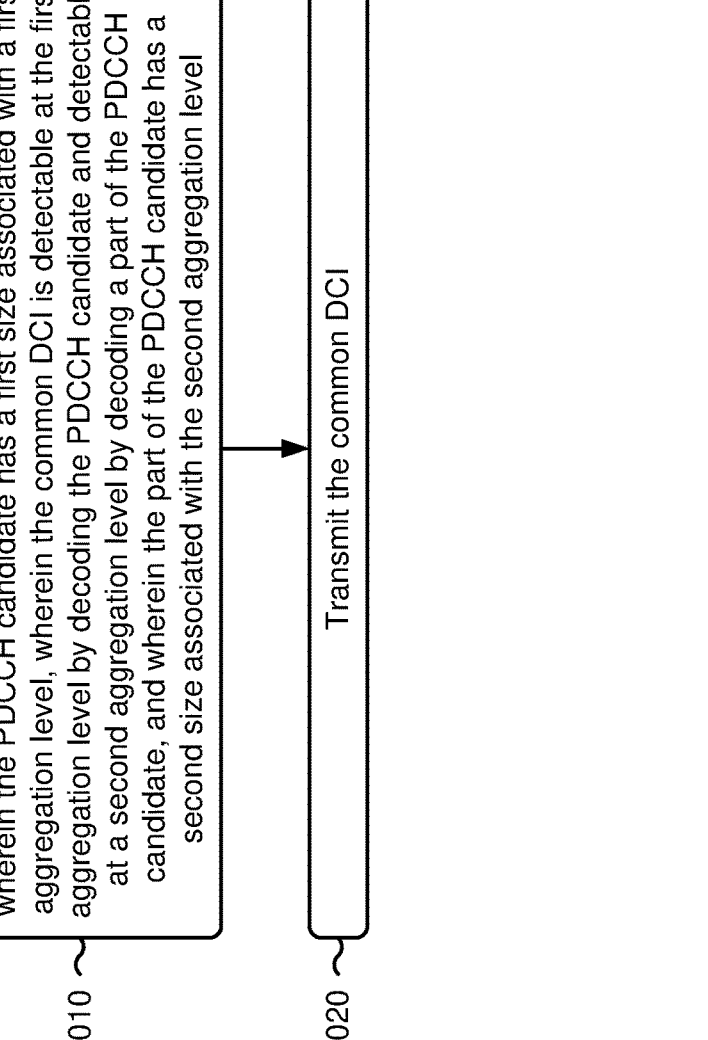

1010 — Map common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level by decoding a part of the PDCCH candidate, and wherein the part of the PDCCH candidate has a second size associated with the second aggregation level 1020 — Transmit the common DCI

COMMON CONTROL CHANNEL

CROSS-REFERENCE TO RELATED APPLICATION

This Patent Application is a 371 national stage of PCT Application No. PCT/CN2021/070635 filed on Jan. 7, 2021, entitled "COMMON CONTROL CHANNEL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a common control channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like. A BS may transmit control information to a variety of UEs in order to configure or control operations of the UEs. In some cases, common control information may be transmitted to UEs associated with different capabilities, such as a reduced capability (RedCap) UE and another UE. In some cases, common control information may be transmitted to UEs associated with different release versions of 3GPP standard, such as RedCap UEs with a more advanced release version and other UEs with a previous release version.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Techniques described herein provide for improved resource utilization, robustness of control signaling, and compatibility of common control signaling for UEs of different capabilities. For example, different UEs may have different capabilities for monitoring control signaling. These different capabilities may be related to the number of resources used to convey the control signaling (e.g., an aggregation level associated with the control signaling). Some techniques described herein provide common control signaling that can be interpreted by UEs at different aggregation levels, which provides compatibility between a UE using a first aggregation level and a UE using a second aggregation level. Since the common control signaling can be decoded at the first aggregation level and the second aggregation level, the common control signaling can be transmitted once for both of the UEs, which improves resource utilization and reduces processor and memory usage. Furthermore, the usage of a larger aggregation level improves coverage for certain types of UEs, while other types of UEs (which cannot or do not use the larger aggregation level) can successfully receive the control signaling using a smaller aggregation level, which provides compatibility (e.g., backward compatibility) between these different types of UEs.

In some aspects, a method of wireless communication performed by a user equipment (UE) includes receiving common downlink control information (DCI) included in a physical downlink control channel (PDCCH) candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and communicating based at least in part on the common DCI.

In some aspects, a method of wireless communication performed by a base station includes mapping common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and transmitting the common DCI.

In some aspects, a UE for wireless communication includes a memory; and one or more processors operatively coupled to the memory, the memory and the one or more processors configured to: receive common DCI included in a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and communicate based at least in part on the common DCI.

In some aspects, a base station for wireless communication includes a memory; and one or more processors operatively coupled to the memory, the memory and the one or more processors configured to: map common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and transmit the common DCI.

In some aspects, a non-transitory computer-readable medium storing a set of instructions for wireless communication includes one or more instructions that, when executed by one or more processors of a UE, cause the UE to: receive common DCI included in a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and communicate based at least in part on the common DCI.

In some aspects, a non-transitory computer-readable medium storing a set of instructions for wireless communication includes one or more instructions that, when executed by one or more processors of a base station, cause the base station to: map common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and transmit the common DCI.

In some aspects, an apparatus for wireless communication includes means for receiving common DCI included in a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and means for communicating based at least in part on the common DCI.

In some aspects, an apparatus for wireless communication includes means for mapping common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and means for transmitting the common DCI.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5 and 6 are diagrams illustrating examples of mapping downlink control information (DCI) to a PDCCH and a part of the PDCCH, in accordance with various aspects of the present disclosure.

FIG. 9 is a diagram illustrating an example process performed, for example, by a UE, in accordance with various aspects of the present disclosure.

FIG. 10 is a diagram illustrating an example process performed, for example, by a base station, in accordance with various aspects of the present disclosure.

DETAILED DESCRIPTION

Figure 1:
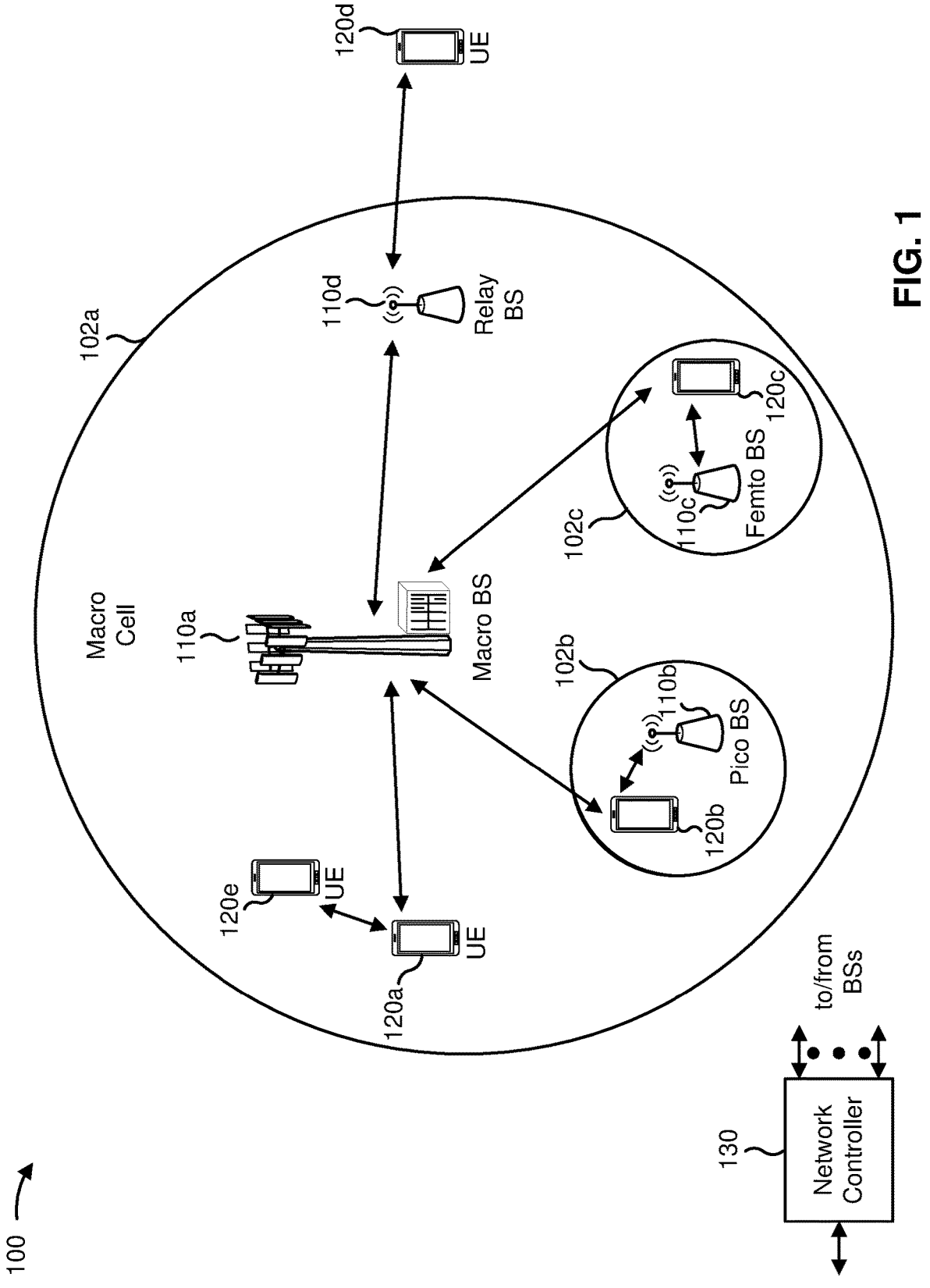
FIG. 1 is a diagram illustrating an example of a wireless network.

Techniques described herein provide for improved resource utilization, robustness of control signaling, and compatibility of common control signaling for UEs of different capabilities. For example, different UEs may have different capabilities for monitoring control signaling. These different capabilities may be related to the number of resources used to convey the control signaling (e.g., an aggregation level associated with the control signaling). Some techniques described herein provide common control signaling that can be interpreted by UEs at different aggregation levels, which provides compatibility between a UE using a first aggregation level and a UE using a second aggregation level. Since the common control signaling can be decoded at the first aggregation level and the second aggregation level, the common control signaling can be transmitted once for both of the UEs, which improves resource utilization and reduces processor and memory usage. Furthermore, the usage of a larger aggregation level improves coverage for certain types of UEs, while other types of UEs (which cannot or do not use the larger aggregation level) can successfully receive the control signaling using a smaller aggregation level, which provides compatibility (e.g., backward compatibility) between these different types of UEs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Examples of UEs include enhanced mobile broadband (eMBB) UEs, ultra-reliable low-latency communication (URLLC) UEs, and vehicle-to-anything (V2X) UEs.

Some UEs may be considered reduced capability (RedCap) UEs, also referred to as NR-Light UEs. A RedCap UE may include, for example, a wearable device, a robot, a drone, a remote device, a sensor, a meter, a monitor, a location tag, a device in an industrial wireless sensor network (IWSN), a surveillance camera, or the like. Generally, a RedCap UE may be associated with reduced capabilities relative to a baseline UE such as an eMBB UE. For example, a RedCap UE may have a reduced number of antennas, a reduced antenna size, a smaller operating bandwidth, or the like. Thus, link budget for some uplink and downlink channels may be degraded, meaning that coverage compensation (such as by using larger aggregation levels for PDCCH transmission) is attractive for deployments involving RedCap UEs.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

As indicated above, FIG. 1 is provided as an example. Other examples may differ from what is described with regard to FIG. 1.

Figure 2:
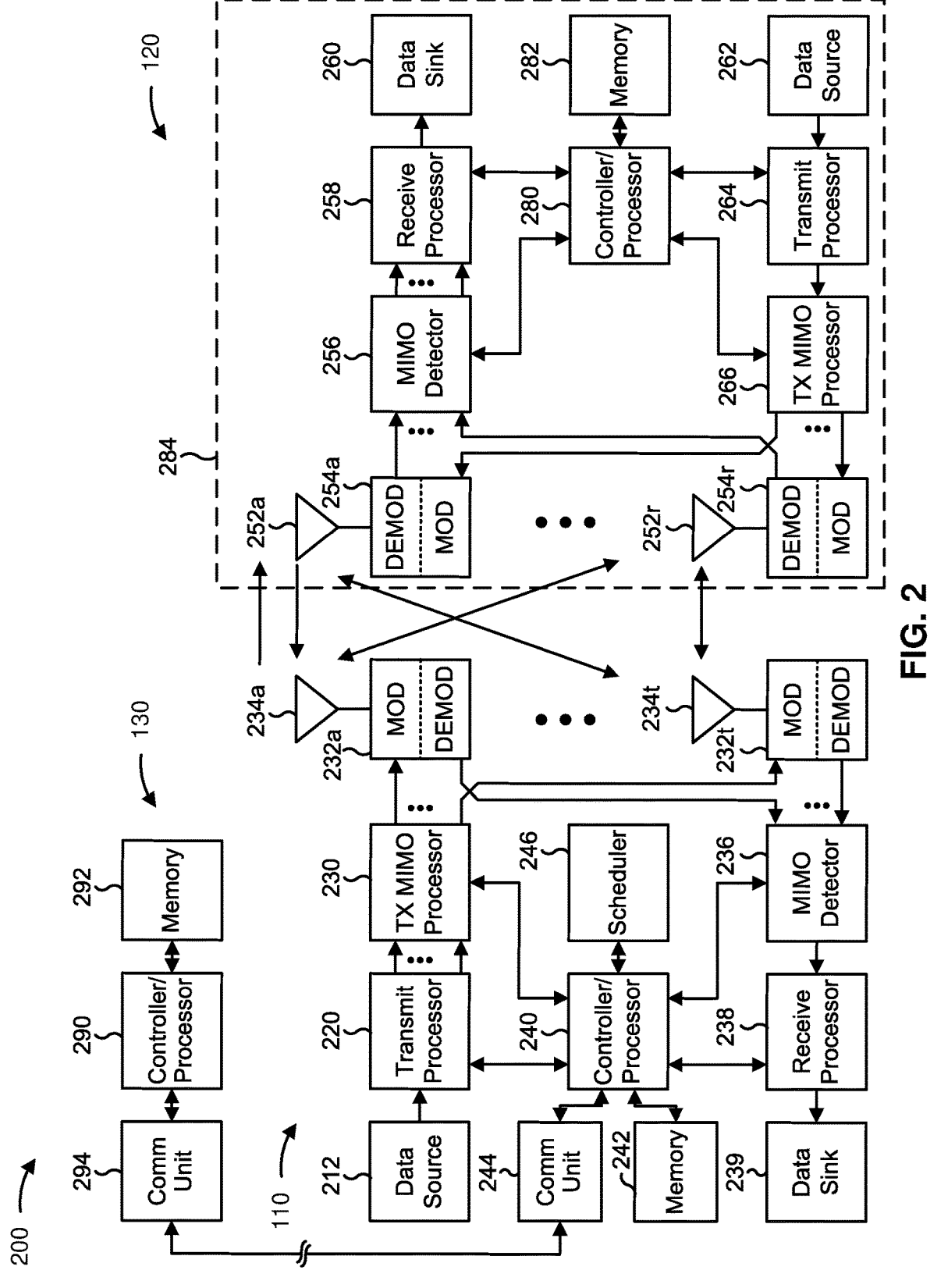
FIG. 2 is a diagram illustrating an example of a base station in communication with a UE in a wireless network.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1. Base station 110 and UE 120 may communicate with each other using signals transmitted and received via antennas 234 and 254 in accordance with various radio access technologies. For a more detailed description of the components shown in FIG. 2, refer to the description accompanying FIG. 11 (for the UE 120) and FIG. 12 (for the base station 110).

Network controller 130 may include communication unit 294, controller/processor 290, and memory 292. Network controller 130 may include, for example, one or more devices in a core network. Network controller 130 may communicate with base station 110 via communication unit 294.

While blocks in FIG. 2 are illustrated as distinct components, the functions described above with respect to the blocks may be implemented in a single hardware, software, or combination component or in various combinations of components. For example, functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
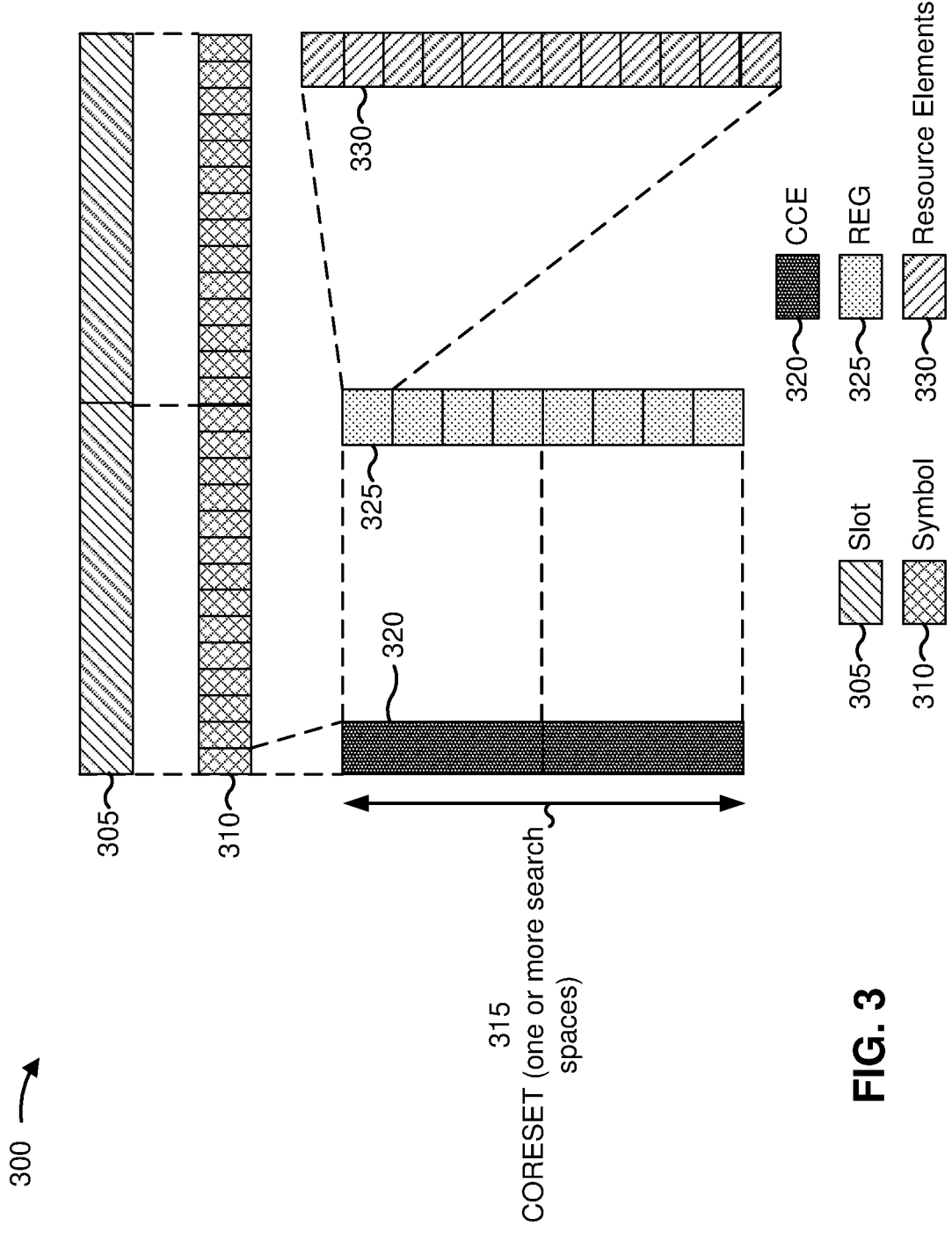
FIG. 3 is a diagram illustrating an example resource structure for wireless communication, in accordance with various aspects of the present disclosure.

FIG. 3 is a diagram illustrating an example resource structure 300 for wireless communication, in accordance with various aspects of the present disclosure. Resource structure 300 shows an example of various groups of resources described herein. As shown, resource structure 300 may include one or more slots 305. In some aspects, a slot 305 may be included in a subframe (not shown). For example, a subframe may include 2 slots per subframe or a different number of slots may be included in a subframe (e.g., 1 slot, 4 slots, 8 slots, 16 slots, 32 slots, and/or the like). In some aspects, different types of transmission time intervals (TTIs) may be used, other than subframes and/or slots. A slot 305 may include multiple OFDM symbols 310, such as 14 symbols per slot.

The potential control region of a slot 305 may be referred to as a control resource set (CORESET) 315. A CORESET is a resource region configured for PDCCH monitoring. A CORESET 315 may be structured to support an efficient use of resources, such as by flexible configuration or reconfiguration of resources of the CORESET 315 for one or more PDCCHs. In some aspects, the CORESET 315 may occupy the first symbol 310 of a slot 305, the first two symbols 310 of a slot 305, or the first three symbols 310 of a slot 305. Thus, a CORESET 315 may include multiple resource blocks (RBs) in the frequency domain, and either one, two, or three symbols 310 in the time domain. In 5G/NR, a quantity of resources included in the CORESET 315 may be flexibly configured, such as by using radio resource control (RRC) signaling to indicate a frequency domain region (e.g., a quantity of resource blocks) and/or a time domain region (e.g., a quantity of symbols) for the CORESET 315.

As illustrated, a symbol 310 that includes CORESET 315 may include one or more control channel elements (CCEs) 320, shown as two CCEs 320 as an example, that span a portion of the system bandwidth. A CCE 320 may include downlink control information (DCI) that is used to provide control information for wireless communication. A BS may transmit DCI during multiple CCEs 320 (as shown), where the quantity of CCEs 320 used for transmission of DCI represents the aggregation level (AL) used by the BS for the transmission of DCI. In FIG. 3, an aggregation level of two is shown as an example, corresponding to two CCEs 320 in a slot 305. In some aspects, different aggregation levels may be used, such as 1, 2, 4, 8, 12, 16, 24, and/or the like.

Each CCE 320 may include a fixed quantity of resource element groups (REGs) 325, shown as 6 REGs 325, or may include a variable quantity of REGs 325. In some aspects, the quantity of REGs 325 included in a CCE 320 may be specified by a REG bundle size. A REG 325 may include one physical resource block (PRB), which may include 12 resource elements (REs) 330 within a symbol 310. A resource element 330 may occupy one subcarrier in the frequency domain and one OFDM symbol in the time domain. A CORESET 315 may be configured by a bitmap that indicates frequency-domain resources (e.g., each bit of the bitmap may represent a number of consecutive PRBs, such as 6 consecutive PRBs). The REGs 325 of a CCE 320 that includes 6 REGs 325 may be arranged in a 1×6 pattern (indicating 1 occasion in the tome domain and 6 occasions in the frequency domain), a 2×3 pattern, or a 3×2 pattern, among other examples. The time-frequency pattern used for a CCE 320 may depend on the number of symbols configured for a corresponding CORESET 315. REGs 325 within a CCE 320 may be indexed in a time-first fashion.

A search space may include all possible locations (e.g., in time and/or frequency) where a PDCCH may be located. A CORESET 315 may include one or more search spaces, such as a UE-specific search space, a group-common search space, and/or a common search space. A search space may indicate a set of CCE locations where a UE may detect PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate. In other words, a PDCCH candidate on which a PDCCH is transmitted may include the PDCCH (and may thus include DCI transmitted via the PDCCH).

The set of all PDCCH candidates at an aggregation level may be referred to as a search space. For example, the set of all PDCCH candidates for a particular UE may be referred to as a UE-specific search space. Similarly, the set of all PDCCH candidates across all UEs may be referred to as a common search space. The set of all PDCCH candidates for a particular group of UEs may be referred to as a group-common search space. One or more search spaces across aggregation levels may be referred to as a search space (SS) set.

As described above, a PDCCH candidate is a potential PDCCH to monitor within a CORESET 315. A PDCCH candidate may be defined by a starting CCE index and a number of CCEs 320 with consecutive CCE indexes. For example, a PDCCH candidate having a size defined by an aggregation level of 8 may include 8 CCEs 320 with CCE indexes {0, 1, . . . , 7} in a CORESET 315 with 12 CCEs 320. As another example, two PDCCH candidates having sizes defined by an aggregation level of 4 may include 4 CCEs 320 with CCE indexes {0, 1, 2, 3} and {8, 9, 10, 11} in a CORESET 315 with 12 CCEs 320. It should be noted that the above are merely examples, and the PDCCH candidates can be arranged in other fashions within a CORESET 315. A UE may receive a PDCCH based at least in part on an aggregation level associated with the PDCCH. For example, the UE may detect DCI transmitted via the PDCCH at a given aggregation level by performing decoding of a PDCCH candidate of a size associated with the aggregation level. Since the UE does not know whether the PDCCH candidate will include a transmitted PDCCH, the attempted decoding of a PDCCH candidate is often referred to as blind decoding.

The starting CCE 320 of a PDCCH candidate may be based at least in part on an aggregation level, a total number of PDCCH candidates, and/or other information. For example, for each aggregation level (AL) $L_{AL}$ configured for a search space s associated CORESET p, a total number $$M_{s,max}^{(L_{AL})}$$

of PDCCH candidates may be configured. The starting index of a PDCCH candidate $$m_s \in \{0, 1, \ldots, M_{s,max}^{(L_{AL})} - 1\}$$

may be determined by a formula of the form $$L_{AL} \cdot \left\{ \left( Y + \left\lfloor \frac{m_s \cdot N_{CCE,p}}{L_{AL} \cdot M_{s,max}^{(L_{AL})}} \right\rfloor \right) \bmod \lfloor N_{CCE,p}/L_{AL} \rfloor \right\},$$

where $N_{CCE,p}$ is the total number of CCEs of CORESET p. Y may be a randomized number based at least in part on a slot index and cell-specific radio network temporary identifier (C-RNTI) value for a USS (UE-specific search space) or a hash function for random resource selection, or may be 0 (zero) for a common search space.

A CORESET 315 may be interleaved or non-interleaved. An interleaved CORESET 315 may have CCE-to-REG mapping such that adjacent CCEs are mapped to scattered REG bundles in the frequency domain (e.g., adjacent CCEs are not mapped to consecutive REG bundles of the CORESET 315). The REG bundle may be the interleaving unit for CCE-to-REG mapping. A bundle size of a REG bundle can be 2, 3, or 6, among other examples. A non-interleaved CORESET 315 may have a CCE-to-REG mapping such that all CCEs are mapped to consecutive REG bundles (e.g., in the frequency domain) of the CORESET 315. CCE-to-REG interleaving may be assumed for a CORESET #0 during initial access. CORESET #0 may carry a PDCCH that schedules a system information block (e.g., system information block (SIB) 1 (SIB1)).

A REG 325 may include demodulation reference signals (DMRSs). A DMRS is a reference signal used by a receiver of a channel to demodulate the channel. A DMRS may be transmitted on a number of REs of a REG 325, and may be frequency division multiplexed (FDMed) with REs carrying DCI. As one example, REs indexes 1, 5, and 9 within a REG 325 may be DMRS REs, while the other REs of the REG 325 may be DCI REs.

Generally, a larger AL (including more CCEs 320) may provide better coverage than a smaller AL (including fewer CCEs 320). Therefore, a larger AL may be advantageous to enhance coverage. As one particular example, an AL of 24 (e.g., 24 CCEs 320) may be used to enhance coverage of a PDCCH relative to an AL of 16. As another example, an AL of 12 may be used to enhance coverage relative to a PDCCH with an AL of 8 for a UE that cannot support an AL of 16 (but can support an AL of 12). In some cases, a PDCCH may carry common control information, such as common DCI directed to multiple UEs. Examples of use cases for common DCI include system information, paging messages, and initial access messaging. A PDCCH carrying common DCI may be referred to herein as a common PDCCH or a broadcast PDCCH.

Transmitting a common PDCCH at only a larger AL (e.g., 12 or 24) may lead to some UEs being unable to detect the common PDCCH due to the larger AL, whereas transmitting the common PDCCH at only a smaller AL may provide insufficient coverage for some UEs. This may be particularly problematic for the combination of RedCap UEs and baseline UEs, since RedCap UEs may have difficulty decoding PDCCHs at lower ALs, whereas baseline UEs may not support higher ALs. Transmitting a common PDCCH multiple times at different ALs may be inefficient and may use significant computing and communication resources. Some techniques and apparatuses described herein provide transmission of a common PDCCH that can be successfully decoded by UEs using multiple different ALs, as described elsewhere herein. Thus, a shared common PDCCH between RedCap UEs and baseline UEs (such as eMBB, URLLC, and V2X UEs) is enabled.

As indicated above, FIG. 3 is provided as an example. Other examples may differ from what is described with respect to FIG. 3.

Figure 4:
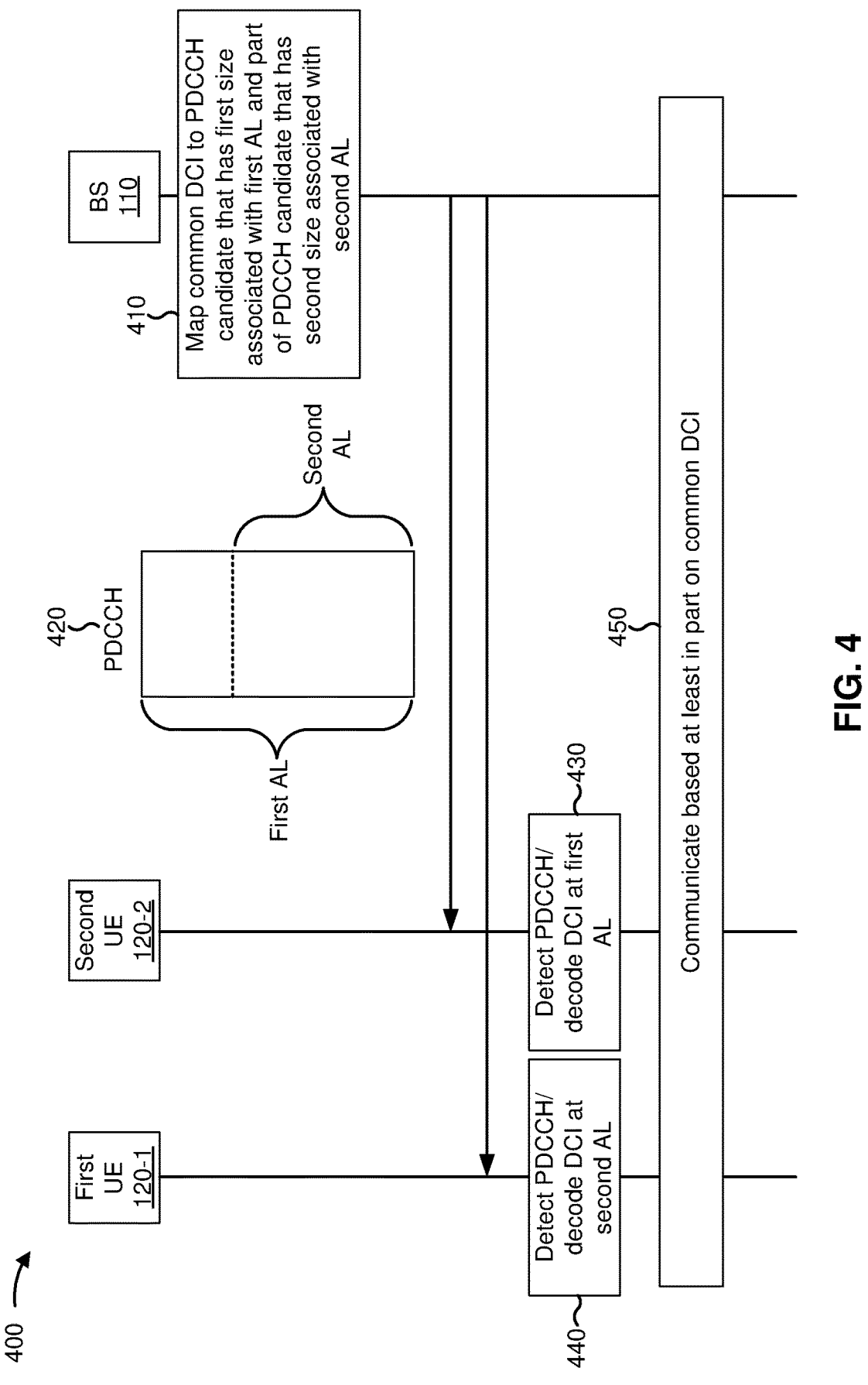
FIG. 4 is a diagram illustrating an example of signaling associated with providing a physical downlink control channel (PDCCH) that is detectable at multiple aggregation levels, in accordance with various aspects of the present disclosure.

FIG. 4 is a diagram illustrating an example 400 of signaling associated with providing a PDCCH that is detectable at multiple aggregation levels, in accordance with various aspects of the present disclosure. As shown, example 400 includes a BS 110 (hereinafter referred to as a BS), a first UE 120-1 (hereinafter referred to as a first UE), and a second UE 120-2 (hereinafter referred to as a second UE). The first UE may be associated with a first aggregation level, meaning that the first UE is capable of and/or configured to detect PDCCHs at the first aggregation level. Similarly, the second UE may be associated with a second aggregation level. In some aspects, the second aggregation level may be smaller than the first aggregation level (e.g., may include fewer CCEs per PDCCH than the first aggregation level). As a first example, the first aggregation level may have a first size of 24 CCEs and the second aggregation level may have a second size of 16 CCEs. As a second example, the first aggregation level may have a first size of 12 CCEs and the second aggregation level may have a second size of 8 CCEs. As a third example, the first aggregation level may have a first size of 11 CCEs and the second aggregation level may have a second size of 8 CCEs.

As shown by reference number 410, the BS may map common DCI to a PDCCH candidate. The common DCI may be directed to a plurality of UEs. In some aspects, the common DCI may be associated with a broadcast PDCCH or a groupcast PDCCH, such as for system information, paging messages, initial access information, or the like. As shown, the BS may map the common DCI to a PDCCH candidate that has a first size associated with the first AL, and may map the common DCI to a part of the PDCCH candidate that has a second size associated with the second AL. As used herein, "mapping common DCI" may refer to encoding and rate matching DCI and mapping rate-matched bits to REs of the PDCCH.

The PDCCH candidate may be included in a CORESET. The PDCCH candidate may span a first region of the CORESET (corresponding to the part of the PDCCH candidate to which the common DCI is mapped) and a second region of the CORESET (corresponding to a remainder of the PDCCH candidate other than the part of the PDCCH candidate). In other words, the first region may have a size corresponding to the second size and the second region may have a size corresponding to a difference between the first size and the second size. In a first example, the size of the first region may be 16 CCEs and the size of the second region may be 8 CCEs. In a second example, the size of the first region may be 8 CCEs and the size of the second region may be 4 CCEs.

The transmitted PDCCH is shown by reference number 420. As shown, the transmitted PDCCH may be associated with the first AL (e.g., 24 CCEs or 16 CCEs, in two examples). As further shown, a part of the PDCCH may be associated with the second AL (e.g., 16 CCEs or 8 CCEs, in two examples). It can be seen that the part of the PDCCH is included in the PDCCH candidate that carries the PDCCH. As mentioned above, the BS may map the DCI to the PDCCH (at the first AL) and to the part of the PDCCH (at the second AL). Thus, the first UE can detect and decode the common DCI at the first AL, and the second UE can detect and decode the common DCI from the part of the PDCCH at the second AL. For a more detailed description of techniques for mapping the common DCI to the PDCCH, refer to the description accompanying FIGS. 5 and 6.

In some aspects, the BS may map the common DCI based at least in part on a starting CCE index. A starting CCE index defines a first CCE of a set of CCEs with consecutive CCE indexes to which DCI is to be mapped. In some aspects, a starting CCE index for a first aggregation level (e.g., a larger aggregation level) may be an integer multiple of a second aggregation level (e.g., a smaller aggregation level). For example, the starting CCE index of the PDCCH candidate may be an integer multiple of a number of CCEs of the second aggregation level. As a more particular example, when the first AL is 12 and the second AL is 8, possible starting CCE indexes for the PDCCH candidate include 0, 8, 16, and so on.

In some aspects, the BS may map the common DCI based at least in part on a largest permitted starting CCE index of a PDCCH candidate. In some aspects, for a CORESET having N CCEs, a largest permitted starting CCE of the PDCCH candidate is based at least in part on a floor of (N divided by a number of CCEs of the second AL) minus two, multiplied by the number of CCEs of the second AL. If one or more CCEs of the PDCCH candidate occur outside of the CORESET when the largest permitted starting CCE is used, the one or more CCEs may be mapped starting at an initial CCE of the CORESET. For example, consider a CORESET with $N_{CCE}$ CCEs ($N_{CCE}$=N), a first AL (e.g., a number of CCEs of the first AL) of $L_{AL}$, and a second AL (e.g., a number of CCEs of the second AL) of $L'_{AL}$. In this case, the largest starting CCE index is defined by $(\lfloor N_{CCE}/L'_{AL}\rfloor-1)\times L'_{AL}$, and the PDCCH candidate with this largest starting CCE index may wrap around to an initial CCE index (e.g., CCE #0) of the CORESET. Continuing this example, for a PDCCH candidate with $L_{AL}$=12 and $L'_{AL}$=8, in a CORESET with 32 CCEs, the largest permitted starting CCE index is CCE #24, and the associated PDCCH candidate has wrapped-around resources with CCE #{24, 25, . . . , 31, 0, 1, 2, 3}.

In some aspects, for a CORESET having N CCEs, a largest permitted starting CCE of the PDCCH candidate is based at least in part on a floor of (N divided by a number of CCEs of the second AL) minus two, multiplied by the number of CCEs of the second AL. For example, this formula may be used if ((N divided by the number of CCEs of the second AL minus one), multiplied by the number of CCEs of the second AL) plus the number of CCEs of the first AL is greater than N. For example, consider a CORESET with $N_{CCE}$ CCEs ($N_{CCE}$=N), a first AL (e.g., a number of CCEs of the first AL) of $L_{AL}$, and a second AL (e.g., a number of CCEs of the second AL) of $L'_{AL}$. In this case, the largest starting CCE index is defined by $(\lfloor N_{CCE}/L'_{AL}\rfloor-2)\times L'_{AL}$, if $(\lfloor N_{CCE}/L'_{AL}\rfloor-1)\cdot L'_{AL}+L_{AL}>N_{CCE}$. Continuing this example, for a PDCCH candidate with $L_{AL}$=12 and $L'_{AL}$=8, in a CORESET with 32 CCEs, the largest permitted starting CCE index is CCE #16, and no wraparound is needed to be performed.

In some aspects, the common DCI may carry remaining minimum system information (RMSI). RMSI is carried in system information block 1 (SIB1) and may convey cell selection information, a public land mobile network identifier (PLMN), a tracking area code (TAC), a cell identity, radio access network (RAN) notification information, system information scheduling information for other system information (OSI), serving cell information, or the like. In some aspects, for RMSI PDCCH monitoring, there may be a same maximum allowed number of PDCCH candidates for a given first AL and a given second AL. For example, an AL of 8 and an AL of 12 may be associated with a same maximum number of candidates for RMSI (e.g., SIB1) PDCCH monitoring of 2. As another example, an AL of 16 and an AL of 24 may be associated with a same maximum number of candidates for RMSI (e.g., SIB1) PDCCH monitoring of 1.

As shown, the first UE and the second UE may receive the PDCCH. As shown by reference number 430, the first UE may detect the PDCCH and decode the DCI at the first AL. Thus, the PDCCH may be detectable at the first AL (corresponding to the entire PDCCH candidate), which provides improved coverage for the first UE. This may be particularly beneficial for RedCap UEs, UEs associated with poor coverage, and the like. As shown by reference number 440, the second UE may detect the part of the PDCCH and decode the DCI at the second AL. Thus, the part of the PDCCH may be detectable at the second AL (corresponding to the part of the PDCCH candidate), which provides compatibility with UEs incapable of or not configured to operate at the first AL. This may be particularly beneficial for UEs such as eMBB UEs, URLLC UEs, V2X UEs, and the like, which may not support ALs such as 24 and 16.

As shown by reference number 450, the first UE, the second UE, and/or the base station may communicate based at least in part on the common DCI. For example, such communication may relate to system information (e.g., a UE may receive system information via the common DCI, and may perform an action indicated by the system information such as receiving a subsequent communication on a scheduled resource), paging (e.g., a UE may receiving a paging message via the common DCI, and may awaken at a subsequent time to receive a communication if the paging message is directed to the UE), initial access (e.g., a UE may receive initial access information via the common DCI, and may perform an initial access procedure in accordance with the initial access information), or the like. It should be noted that the common DCI can carry information other than or in addition to the information explicitly described above.

In some aspects, the first UE, the second UE, and/or the BS may rate match a PDSCH (or may determine that a PDSCH is rate matched) based at least in part on the common DCI. For a more detailed description of the determination of whether to rate match a PDSCH based at least in part on the common DCI, refer to the description accompanying FIGS. 7 and 8.

As indicated above, FIG. 4 is provided as an example. Other examples may differ from what is described with regard to FIG. 4.

FIGS. 5 and 6 are diagrams illustrating examples 500 and 600 of mapping DCI to a PDCCH and a part of the PDCCH, in accordance with various aspects of the present disclosure. Examples 500 and 600 illustrate how a BS (such as the BS 110 of FIG. 4) may perform mapping of common DCI to a PDCCH and a part of a PDCCH such that the common DCI is compatible with UEs using different ALs. Example 500 is shown as Option 1, and example 600 is shown as Option 2. In examples 500 and 600, the part of the PDCCH (corresponding to the first region of the CORESET described above) is shown as Sub-PDCCH1, and a remainder of the PDCCH (corresponding to the second region of the CORESET described above) is shown as Sub-PDCCH2. Sub-PDCCH1 may correspond to the second AL, and a collective size of Sub-PDCCH1 and Sub-PDCCH2 may correspond to the first AL. In examples 500 and 600, the first AL (e.g., a number of CCEs of the first AL) is represented by $L_{AL}$ and the second AL (e.g., a number of CCEs of the second AL) is represented by $L'_{AL}$. As shown, Sub-PDCCH1 includes CCE #0 (e.g., an initial CCE) through CCE #($L'_{AL}$−1) (due to zero indexing) and Sub-PDCCH2 includes CCE #$L'_{AL}$ through CCE #($L_{AL}$−1).

Examples 500 and 600 relate to rate matching. Rate matching includes one or more operations to match a number of encoded bits of the common DCI to a number of payload REs of the PDCCH. For example, rate matching may include interleaving of encoded systematic and parity bits, bit collection, and pruning or bit repetition (depending on how many bits are to be rate matched and the number of resources to which the bits are to be rate matched). Rate matching may be performed based at least in part on a circular buffer. For example, a transmitter may feed encoded and interleaved bits into a circular buffer (which may be referred to as bit collection), and bit selection may be performed from the circular buffer. By selecting bits from the circular buffer based at least in part on the number of payload REs, the transmitter accomplishes rate matching of the common DCI.

In example 500, rate matching may be performed to match the total resources of the PDCCH. For example, the common DCI may be rate matched to a collective size of the first region of the CORESET and the second region of the CORESET (e.g., a number of RE included in 24 CCEs if the first AL is 24, or 12 CCEs if the first AL is 12). The rate matching to match the total resources of the PDCCH is illustrated by the circular buffer shown by reference number 510, in which the bits mapped to Sub-PDCCH1 and the bits mapped to Sub-PDCCH2 are buffered as part of a same rate matching operation (indicated by the sequential illustration of the arrows corresponding to Sub-PDCCH1 and Sub-PDCCH2). In this case, the rate matched and encoded DCI may be mapped to sub-PDCCH1 and then sub-PDCCH2 sequentially. Reference number 520 illustrates the bit-to-RE mapping for Option 1. As shown by reference numbers 530, 540, 550, and 560, the common DCI may be mapped in a frequency-first fashion to a first symbol of Sub-PDCCH1, then a second symbol of Sub-PDCCH1, then a first symbol of Sub-PDCCH2, then a second symbol of Sub-PDCCH2.

The rate matching of the common DCI to the entire PDCCH may enable a UE using the larger AL to perform soft combining of Sub-PDCCH1 and Sub-PDCCH2 such that the PDCCH can be detected at the larger AL. Furthermore, the mapping of the common DCI to Sub-PDCCH1 first, then to Sub-PDCCH2, may enable a UE using the smaller AL to detect the common DCI as transmitted on the part of the PDCCH candidate corresponding to Sub-PDCCH2, thereby providing compatibility of the common DCI between UEs using the larger AL and UEs using the smaller AL.

In example 600 of FIG. 6, rate matching may be performed separately for Sub-PDCCH1 (e.g., the part of the PDCCH candidate, the first region) and Sub-PDCCH2 (e.g., the remainder of the PDCCH candidate other than the part, the second region). For example, the common DCI may be rate matched to the size of Sub-PDCCH1 and mapped to Sub-PDCCH1, and may be rate matched to the size of Sub-PDCCH2 and mapped to Sub-PDCCH2. In other words, the common PDCCH may be rate-matched and mapped to sub-PDCCH1 and sub-PDCCH2, respectively. The respective rate matching operations are illustrated by the circular buffer shown by reference number 610, in which the bits mapped to Sub-PDCCH1 and the bits mapped to Sub-PDCCH2 are buffered as part of separate rate matching operations (indicated by the parallel or separate illustration of the arrows corresponding to Sub-PDCCH1 and Sub-PDCCH2). In this case, the rate matched and encoded DCI may be mapped to sub-PDCCH1 and to sub-PDCCH2 separately.

Reference number 620 illustrates the bit-to-RE mapping for Option 2. As shown by reference numbers 630 and 640, the common DCI may be mapped in a frequency-first fashion to a first symbol of Sub-PDCCH1 and a second symbol of Sub-PDCCH1. Furthermore, as shown by reference numbers 650 and 660, the common DCI may be mapped in a frequency-first fashion to a first symbol of Sub-PDCCH2 and a second symbol of Sub-PDCCH2. In some aspects, the operations shown by reference numbers 630/640 and 650/660 may be performed in parallel. For example, rate matching and/or bit-to-RE mapping may be performed for Sub-PDCCH1 and for Sub-PDCCH2 contemporaneously.

In some aspects, the encoding of the common DCI for Sub-PDCCH1 and Sub-PDCCH2 may use a same mother polar code. For example, in some radio access technologies, such as 5G/NR, DCI may be encoded via polar coding prior to rate matching and bit-to-RE mapping. Polar coding may be based at least in part on a mother polar code. For example, a set of bits (e.g., associated with one or more appended cyclic redundancy checks (CRCs)) may be input to a polar coding block and may be polar encoded to a mother polar code block length. In the techniques described herein, the mother polar code block length for both Sub-PDCCH1 and Sub-PDCCH2 may be determined based at least in part on a rate-matched and encoded bit length of Sub-PDCCH1 (e.g., the first region of the CORESET, the part of the PDCCH candidate). For example, a mother polar code associated with the second region may be the same as a mother polar code associated with the first region.

The polar encoding of the common DCI using the mother polar code of Sub-PDCCH1 may enable a UE associated with a larger AL to perform soft combining of Sub-PDCCH1 and Sub-PDCCH2 such that the PDCCH can be detected at the larger AL. Furthermore, the separate mapping of the common DCI to Sub-PDCCH1 and Sub-PDCCH2 may enable a UE using the smaller AL to detect the common DCI as transmitted on the part of the PDCCH candidate corresponding to Sub-PDCCH2, thereby providing compatibility of the common DCI between UEs using the larger AL and UEs using the smaller AL.

As indicated above, FIGS. 5 and 6 are provided as examples. Other examples may differ from what is described with regard to FIGS. 5 and 6.

Figure 7:
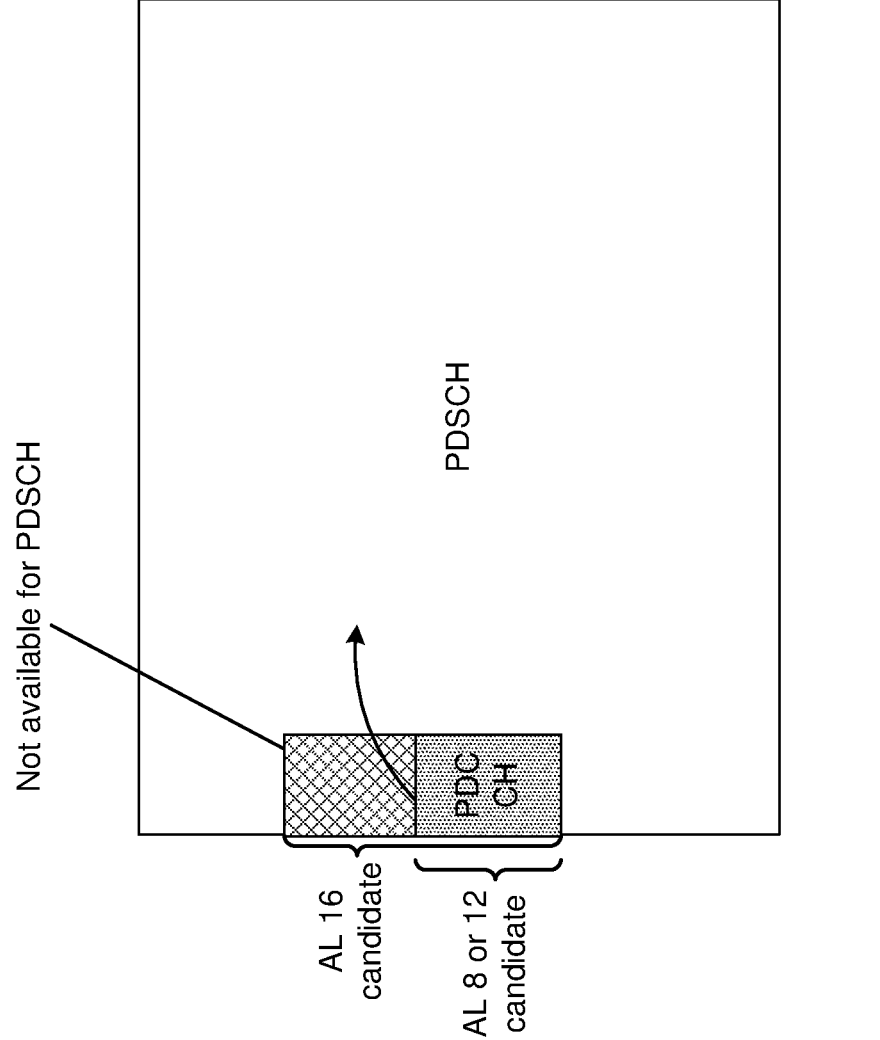
FIG. 7 is a diagram illustrating an example of determination of resources for a physical downlink shared channel (PDSCH) scheduled by DCI, in accordance with various aspects of the present disclosure.

FIG. 7 is a diagram illustrating an example 700 of determination of resources for a physical downlink shared channel (PDSCH) scheduled by DCI, in accordance with various aspects of the present disclosure. FIG. 7 shows a PDSCH (indicated by a white fill). The PDSCH is scheduled by DCI, indicated by a curved arrow from a first PDCCH carrying the DCI to the PDSCH. The first PDCCH is transmitted in a first PDCCH candidate having a first aggregation level (e.g., a smaller aggregation level, such as 8 or 12). Furthermore, a second PDCCH, corresponding to a second PDCCH candidate with a second aggregation level (e.g., a larger aggregation level, such as 16) is associated with a same starting CCE index as the first PDCCH candidate. The first PDCCH and the second PDCCH of FIG. 7 may be transmitted in a one-symbol, non-interleaved CORESET. In some aspects, the DCI may be common DCI, such as described in connection with FIGS. 3-6.

Example 700 shows an example where a UE detects the PDCCH with the smaller AL scheduling the PDSCH. For example, the UE may detect a PDCCH with an AL of 12 that starts at a same CCE index as a PDCCH with an AL of 16. In this case, the UE may treat resources associated with the PDCCH with the AL of 16 as not available for the PDSCH (indicated by the "X" fill of the remainder of the PDCCH with the AL of 16, also referred to herein as a second region of a CORESET carrying the PDCCH with the AL of 16). For example, the UE may rate match the PDSCH around the resources associated with the PDCCH with the AL of 16. In other words, if the DCI schedules a PDSCH, the UE monitors (and the BS may configure) a first PDCCH candidate (say, with an AL of 8 or 12) and a second PDCCH candidate (say, with an AL of 16) based at least in part on the DCI being transmitted in a non-interleaved and one-symbol control resource set, and the second PDCCH candidate is associated with a same starting control channel element as the first PDCCH candidate and a larger aggregation level than the first PDCCH candidate, then resources associated with the second PDCCH candidate are not available for the PDSCH. This technique can be applied in connection with the PDCCH described in connection with FIGS. 3-6 (where the PDCCH described in connection with FIGS. 3-6 is associated with the first PDCCH candidate or the second PDCCH candidate). Additionally, or alternatively, the first PDCCH candidate may carry a PDCCH, and the second PDCCH candidate may carry a part of the PDCCH, both of which may be encoded with a common DCI as described in connection with FIGS. 3-6.

As indicated above, FIG. 7 is provided as an example. Other examples may differ from what is described with regard to FIG. 7.

Figure 8:
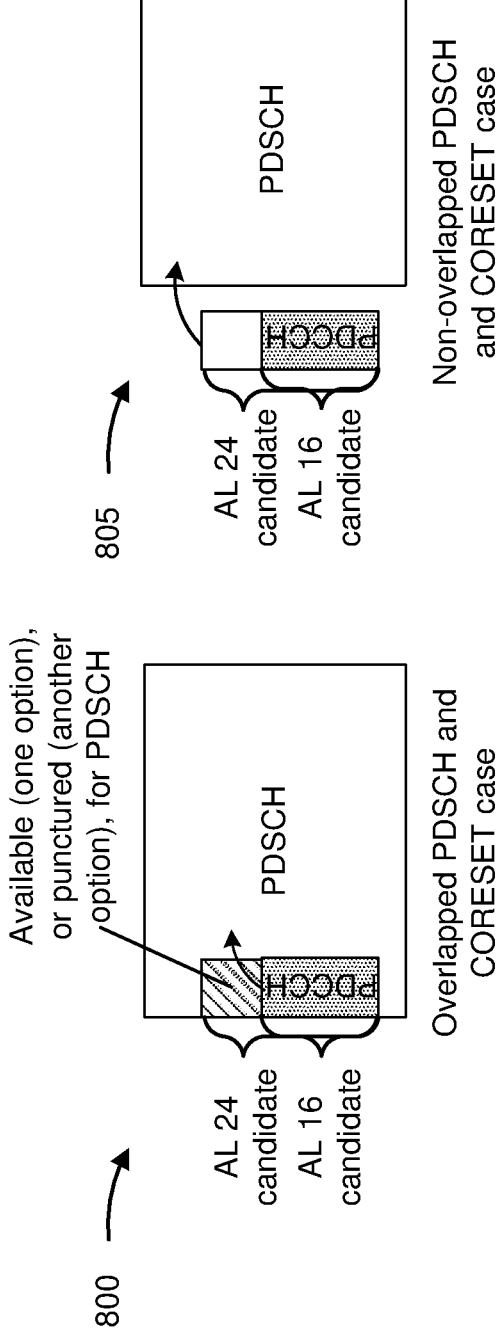
FIG. 8 is a diagram illustrating examples of determination of resources for a PDSCH scheduled by DCI, in accordance with various aspects of the present disclosure.

FIG. 8 is a diagram illustrating examples 800 and 805 of determination of resources for a PDSCH scheduled by common DCI, in accordance with various aspects of the present disclosure. FIG. 8 shows a PDSCH (indicated by a white fill). The PDSCH is scheduled by common DCI, indicated by a curved arrow from a PDCCH carrying the DCI to the PDSCH. For example, the common DCI may be mapped to the PDCCH candidate (associated with a first AL, shown for example as 24) and to a part of the PDCCH candidate (associated with a second AL, shown for example as 16), in accordance with one or more of the techniques described with regard to FIGS. 3-6.

In example 800, the UE may monitor the PDCCH candidate with the larger AL. In this case, the UE may first attempt to decode the part of the PDCCH candidate with a same starting CCE index and a smaller AL (e.g., the part of the PDCCH candidate corresponding to Sub-PDCCH1 of FIGS. 5 and 6, and the AL 16 candidate in example 800). If the UE detects a PDCCH on the part of the PDCCH candidate (e.g., if the UE successfully decodes the PDCCH on the part of the PDCCH candidate), and the PDCCH schedules the PDSCH, in a first aspect (not shown in FIG. 8), the UE may assume a resource associated with the remainder of the PDCCH candidate with the larger AL (e.g., the Sub-PDCCH2 of FIGS. 5 and 6, the second region of the CORESET) is punctured for the scheduled PDSCH. For example, the UE may decode the common DCI on the part of the PDCCH candidate. The UE may puncture a PDSCH scheduled by the common DCI at one or more resources associated with a remainder of the PDCCH candidate other than the part of the PDCCH candidate. "Puncturing" may refer to dropping REs of the scheduled PDSCH at the resource (e.g., rather than rate matching the PDSCH to include the REs of the scheduled PDSCH at the resource).

In a second aspect, as shown in example 800, the UE may treat the resource associated with the remainder of the PDCCH candidate with the larger AL as available for the PDSCH. For example, the UE may decode the common DCI on the part of the PDCCH candidate. The UE may treat, based at least in part on decoding the common DCI on the part of the PDCCH candidate, one or more resources associated with a remainder of the PDCCH candidate, other than the part of the PDCCH candidate, as available for a PDSCH scheduled by the common DCI.

Example 805 shows an example where the CORESET is not overlapped with the PDSCH scheduled by the PDCCH, so no puncturing or determination of PDSCH resource availability is needed to be performed.

As indicated above, FIG. 8 is provided as an example. Other examples may differ from what is described with regard to FIG. 8.

FIG. 9 is a diagram illustrating an example process 900 performed, for example, by a UE, in accordance with various aspects of the present disclosure. Example process 900 is an example where the UE (e.g., UE 120) performs operations associated with providing a backward-compatible common control channel.

As shown in FIG. 9, in some aspects, process 900 may include receiving common DCI included in a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level (block 910). For example, the UE (e.g., using reception component 1102, depicted in FIG. 11) may receive common DCI included in a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level, as described above. In some aspects, the first aggregation level is a larger aggregation level and the second aggregation level is a smaller aggregation level, as described elsewhere herein.

As further shown in FIG. 9, in some aspects, process 900 may include communicating based at least in part on the common DCI (block 920). For example, the UE (e.g., using transmission component 1104 or reception component 1102, depicted in FIG. 11) may communicate based at least in part on the common DCI, as described above.

Process 900 may include additional aspects, such as any single aspect or any combination of aspects described below and/or in connection with one or more other processes described elsewhere herein.

In a first aspect, the part of the PDCCH candidate spans a first region of a CORESET and the PDCCH candidate spans the first region and a second region of the CORESET, wherein the first region has a size corresponding to the second size and the second region has a size corresponding to a difference between the first size and the second size.

In a second aspect, alone or in combination with the first aspect, the common DCI is rate matched to a collective size of the first region and the second region, and the common DCI is mapped to the first region and to the second region sequentially.

In a third aspect, alone or in combination with one or more of the first and second aspects, the common DCI is rate matched to the size of the first region and mapped to the first region, and the common DCI is rate matched to the size of the second region and mapped to the second region.

In a fourth aspect, alone or in combination with one or more of the first through third aspects, a mother polar code associated with the second region is the same as a mother polar code associated with the first region.

In a fifth aspect, alone or in combination with one or more of the first through fourth aspects, a starting control channel element (CCE) index of the PDCCH candidate is an integer multiple of a number of CCEs of the second aggregation level.

In a sixth aspect, alone or in combination with one or more of the first through fifth aspects, for a control resource set having N CCEs, a largest permitted starting CCE of the PDCCH candidate is based at least in part on a floor of (N divided by a number of CCEs of the second aggregation level) minus one, multiplied by the number of CCEs of the second aggregation level.

In a seventh aspect, alone or in combination with one or more of the first through sixth aspects, if one or more CCEs of the PDCCH candidate occur outside of the control resource set when the largest permitted starting CCE is used, the one or more CCEs are mapped starting at an initial CCE (e.g., CCE #0) of the control resource set.

In an eighth aspect, alone or in combination with one or more of the first through seventh aspects, for a control resource set having N CCEs, a largest permitted starting CCE of the PDCCH candidate is based at least in part on a floor of (N divided by a number of CCEs of the second aggregation level) minus two, multiplied by the number of CCEs of the second aggregation level.

In a ninth aspect, alone or in combination with one or more of the first through fifth eighth, the common DCI schedules a physical downlink shared channel (PDSCH), the PDCCH candidate is a first PDCCH candidate, and the process 900 further comprises monitoring the first PDCCH candidate and a second PDCCH candidate based at least in part on the common DCI being transmitted in a non-interleaved and one-symbol control resource set, wherein the second PDCCH candidate is associated with a same starting control channel element as the first PDCCH candidate and a larger aggregation level than the first PDCCH candidate, and wherein resources associated with the second PDCCH candidate are not available for the PDSCH.

In a tenth aspect, alone or in combination with one or more of the first through ninth aspects, receiving the common DCI further comprises decoding (e.g., using the detection/decoding component 1108 of FIG. 11) the common DCI on the part of the PDCCH candidate, and treating, based at least in part on decoding the common DCI on the part of the PDCCH candidate (e.g., using the reception component 1102 of FIG. 11), one or more resources associated with a remainder of the PDCCH candidate, other than the part of the PDCCH candidate, as available for a physical downlink shared channel scheduled by the common DCI.

In an eleventh aspect, alone or in combination with one or more of the first through tenth aspects, receiving the common DCI further comprises decoding (e.g., using the detection/decoding component 1108 of FIG. 11) the common DCI on the part of the PDCCH candidate, and puncturing (e.g., using the reception component 1102 of FIG. 11) a physical downlink shared channel scheduled by the common DCI at one or more resources associated with a remainder of the PDCCH candidate other than the part of the PDCCH candidate.

In a ninth aspect, alone or in combination with one or more of the first through eighth aspects, the common DCI is associated with a remaining minimum system information block, and the first aggregation level and the second aggregation level are associated with a same maximum allowed number of PDCCH candidates based at least in part on the common DCI being associated with the remaining minimum system information block.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with various aspects of the present disclosure. Example process 1000 is an example where the base station (e.g., base station 110) performs operations associated with encoding and transmitting a backward-compatible common control channel.

As shown in FIG. 10, in some aspects, process 1000 may include mapping common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level (block 1010). For example, the base station (e.g., using encoding/mapping component 1208, depicted in FIG. 12) may map common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level, as described above. In some aspects, the first aggregation level is a larger aggregation level and the second aggregation level is a smaller aggregation level, as described elsewhere herein.

As further shown in FIG. 10, in some aspects, process 1000 may include transmitting the common DCI (block 1020). For example, the base station (e.g., using transmission component 1204, depicted in FIG. 12) may transmit the common DCI, as described above.

Process 1000 may include additional aspects, such as any single aspect or any combination of aspects described below and/or in connection with one or more other processes described elsewhere herein.

In a first aspect, the part of the PDCCH candidate spans a first region of a CORESET and the PDCCH candidate spans the first region and a second region of the CORESET, wherein the first region has a size corresponding to the second size and the second region has a size corresponding to a difference between the first size and the second size.

In a second aspect, alone or in combination with the first aspect, the common DCI is rate matched to a collective size of the first region and the second region, and the common DCI is mapped to the first region and to the second region sequentially.

In a third aspect, alone or in combination with one or more of the first and second aspects, the common DCI is rate matched to the size of the first region and mapped to the first region, and the common DCI is rate matched to the size of the second region and mapped to the second region.

In a fourth aspect, alone or in combination with one or more of the first through third aspects, a mother polar code associated with the second region is the same as a mother polar code associated with the first region.

In a fifth aspect, alone or in combination with one or more of the first through fourth aspects, a starting CCE index of the PDCCH candidate is an integer multiple of a number of CCEs of the second aggregation level.

In a sixth aspect, alone or in combination with one or more of the first through fifth aspects, for a control resource set having N CCEs, a largest permitted starting CCE of the PDCCH candidate is based at least in part on a floor of (N divided by a number of CCEs of the second aggregation level) minus one.

In a seventh aspect, alone or in combination with one or more of the first through sixth aspects, if one or more CCEs of the PDCCH candidate occur outside of the control resource set when the largest permitted starting CCE is used, the one or more CCEs are mapped starting at an initial CCE of the control resource set.

In an eighth aspect, alone or in combination with one or more of the first through seventh aspects, for a control resource set having N CCEs, a largest permitted starting CCE of the PDCCH candidate is based at least in part on a floor of (N divided by a number of CCEs of the second aggregation level) minus two.

In a ninth aspect, alone or in combination with one or more of the first through eighth aspects, the common DCI schedules a PDSCH, the PDCCH candidate is a first PDCCH candidate, and the process 1000 further comprises configuring (e.g., using transmission component 1204) a second PDCCH candidate based at least in part on the common DCI being transmitted in a non-interleaved and one-symbol control resource set, wherein the second PDCCH candidate is associated with a same starting control channel element as the first PDCCH candidate and a larger aggregation level than the first PDCCH candidate, and wherein resources associated with the second PDCCH candidate are not available for the PDSCH.

In a tenth aspect, alone or in combination with one or more of the first through ninth aspects, if the common DCI is decoded on the part of the PDCCH candidate, one or more resources associated with a remainder of the PDCCH candidate, other than the part of the PDCCH candidate, are treated as available for a physical downlink shared channel scheduled by the common DCI.

In an eleventh aspect, alone or in combination with one or more of the first through tenth aspects, if the common DCI is decoded on the part of the PDCCH candidate, one or more resources of a physical downlink shared channel scheduled by the common DCI are punctured based at least in part on the one or more resources being associated with a remainder of the PDCCH candidate other than the part of the PDCCH candidate.

In a twelfth aspect, alone or in combination with one or more of the first through eleventh aspects, the common DCI is associated with a remaining minimum system information block, and the first aggregation level and the second aggregation level are associated with a same maximum allowed number of PDCCH candidates based at least in part on the common DCI being associated with the remaining minimum system information block.

In a thirteenth aspect, alone or in combination with one or more of the first through twelfth aspects, the common DCI is mapped to be detectable at the first aggregation level and at the second aggregation level based at least in part on the common DCI being directed to a reduced capability UE associated with the first aggregation level.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
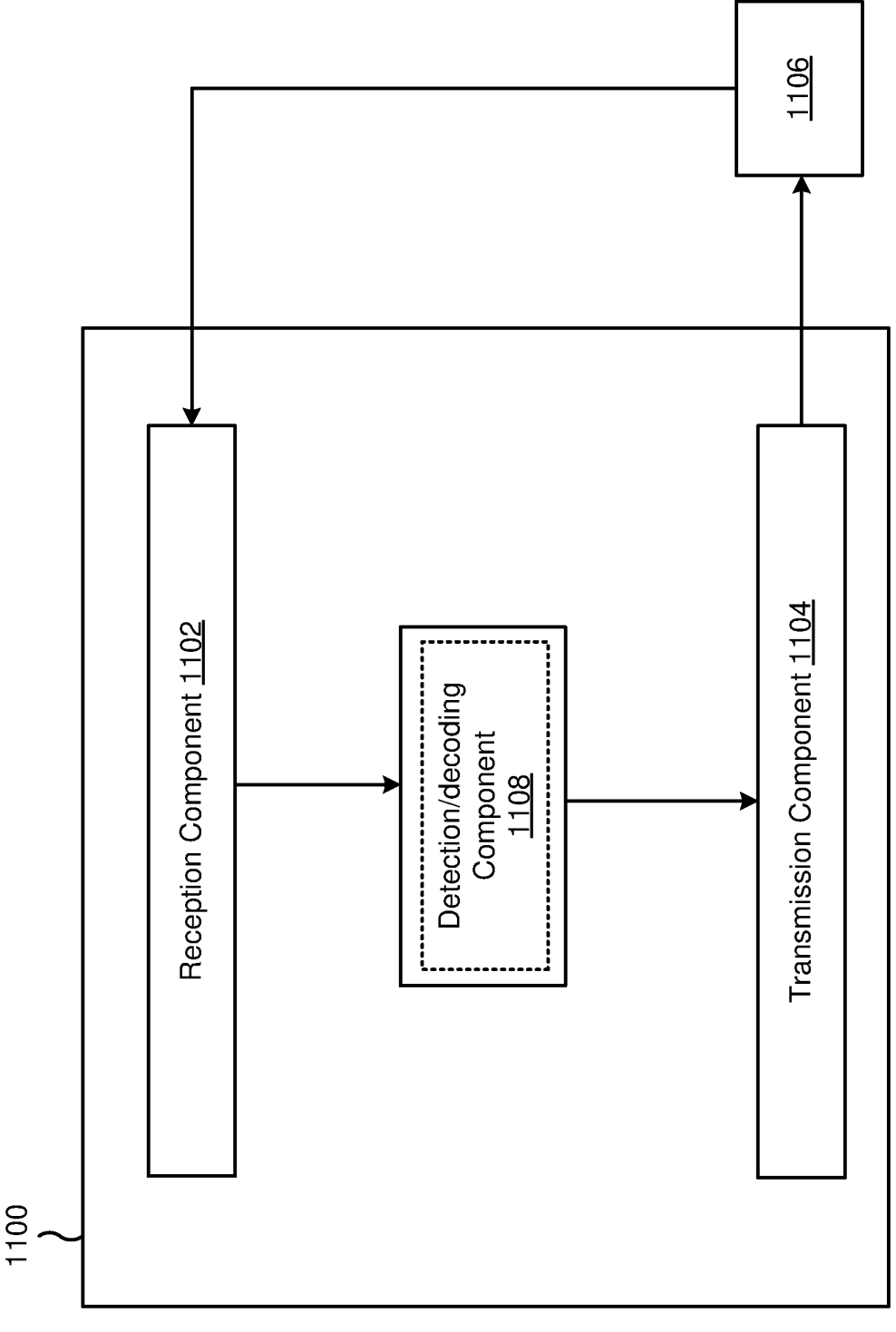
FIG. 11 is a block diagram of an example apparatus for wireless communication, in accordance with various aspects of the present disclosure.

FIG. 11 is a block diagram of an example apparatus 1100 for wireless communication, in accordance with various aspects of the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a detection/decoding component 1108, among other examples. In some aspects, the detection/decoding component 1108 may include one or more antennas, a modulator, a transmit MIMO processor, a transmit processor, a controller/processor, a memory, or a combination thereof, of the UE described above in connection with FIG. 2, and described in more detail below.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described above in connection with FIG. 2, and described in more detail below. Additionally, or alternatively, one or more components shown in FIG. 11 may be implemented within one or more components described above in connection with FIG. 2, and described in more detail below. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2, and described in more detail below.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2, and described in more detail below. In some aspects, the transmission component 1104 may be co-located with the reception component 1102 in a transceiver.

The reception component 1102 may receive common DCI included in a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level. The transmission component 1104 or the reception component 1102 may communicate based at least in part on the common DCI.

As mentioned above, apparatus 1100 may be or may be included in a UE such as UE 120. The UE may include various components, which are shown in FIG. 2 and which are described in detail here. On the downlink, at UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-10.

UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In some aspects, two or more UEs 120 (e.g., shown in FIG. 1 as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Controller/processor 280 of UE 120 and/or any other component(s) of FIG. 2 may perform one or more techniques associated with a backward-compatible common control channel, as described in more detail elsewhere herein. For example, controller/processor 280 of UE 120, and/or any other component(s) of FIG. 2 may perform or direct operations of, for example, process 900 of FIG. 9, and/or other processes as described herein. Memory 282 may store data and program codes for UE 120. In some aspects, memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the UE 120, may cause the one or more processors and/or the UE 120 to perform or direct operations of, for example, process 900 of FIG. 9 and/or other processes as described herein. In some aspects, executing instructions may include running the instructions, converting the instructions, compiling the instructions, and/or interpreting the instructions, among other examples.

In some aspects, the UE includes means for receiving common downlink control information (DCI) included in a physical downlink control channel (PDCCH) candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; or means for communicating based at least in part on the common DCI. The means for the user equipment (UE) to perform operations described herein may include, for example, one or more of antenna 252, demodulator 254, MIMO detector 256, receive processor 258, transmit processor 264, TX MIMO processor 266, modulator 254, controller/processor 280, or memory 282.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
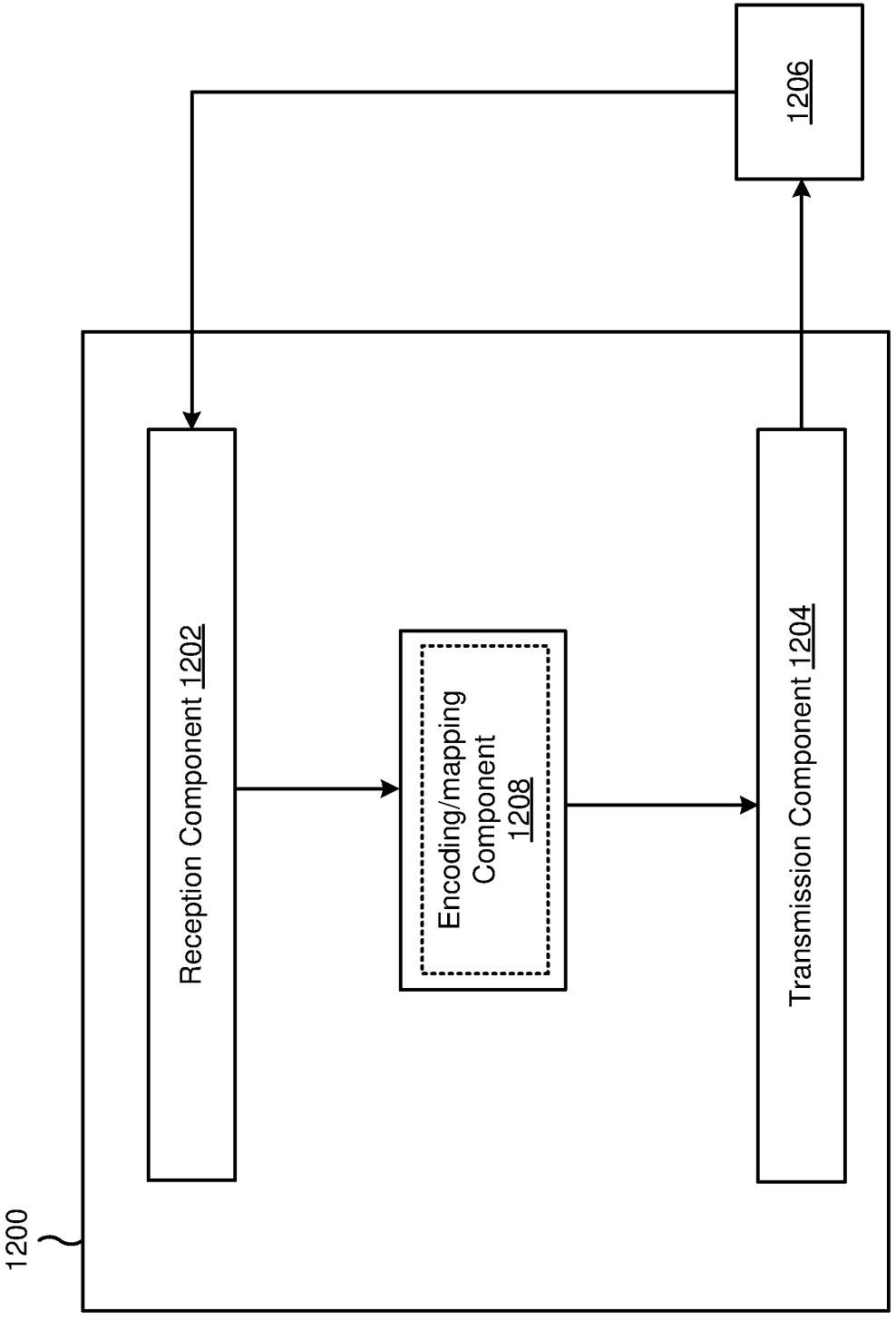
FIG. 12 is a block diagram of an example apparatus for wireless communication, in accordance with various aspects of the present disclosure.

FIG. 12 is a block diagram of an example apparatus 1200 for wireless communication, in accordance with various aspects of the present disclosure. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include an encoding/mapping component 1208, among other examples. In some aspects, the encoding/mapping component 1208 may include one or more antennas, a demodulator, a MIMO detector, a receive processor, a controller/processor, a memory, or a combination thereof, of the base station described above in connection with FIG. 2, and in more detail below.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described above in connection with FIG. 2, and in more detail below. Additionally, or alternatively, one or more components shown in FIG. 12 may be implemented within one or more components described above in connection with FIG. 2, and in more detail below. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2, and in more detail below.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The encoding/mapping component 1208 may map common DCI to a PDCCH associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level. The transmission component 1204 may transmit the common DCI.

As mentioned above, the apparatus 1200 may be or may be included in a base station, such as base station 110. The base station may include various components, which are shown in FIG. 2 and described in detail here. On the downlink, at base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

On the uplink, at base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-10.

Controller/processor 240 of base station 110 and/or any other component(s) of FIG. 2 may perform one or more techniques associated with a backward-compatible common control channel, as described in more detail elsewhere herein. For example, controller/processor 240 of base station 110 and/or any other component(s) of FIG. 2 may perform or direct operations of, for example, process 1000 of FIG. 10, and/or other processes as described herein. Memory 242 may store data and program codes for base station 110. In some aspects, memory 242 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, may cause the one or more processors, the UE 120, and/or the base station 110 to perform or direct operations of, for example, process 1000 of FIG. 10, and/or other processes as described herein. In some aspects, executing instructions may include running the instructions, converting the instructions, compiling the instructions, and/or interpreting the instructions, among other examples.

In some aspects, the base station includes means for mapping common downlink control information (DCI) to a physical downlink control channel (PDCCH) associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; or means for transmitting the common DCI. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some aspects of the present disclosure:

Aspect 1: A method of wireless communication performed by a user equipment (UE), comprising: receiving common downlink control information (DCI) included in a physical downlink control channel (PDCCH) candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and communicating based at least in part on the common DCI.

Aspect 2: The method of aspect 1, wherein the part of the PDCCH candidate spans a first region of a control resource set (CORESET) and the PDCCH candidate spans the first region and a second region of the CORESET, wherein the first region has a size corresponding to the second size and the second region has a size corresponding to a difference between the first size and the second size.

Aspect 3: The method of aspect 2, wherein the common DCI is rate matched to a collective size of the first region and the second region, and wherein the common DCI is mapped to the first region and to the second region sequentially.

Aspect 4: The method of aspect 2, wherein the common DCI is rate matched to the size of the first region and mapped to the first region, and the common DCI is rate matched to the size of the second region and mapped to the second region.

Aspect 5: The method of aspect 4, wherein a mother polar code associated with the second region is the same as a mother polar code associated with the first region.

Aspect 6: The method of any of aspects 1-5, wherein a starting control channel element (CCE) index of the PDCCH candidate is an integer multiple of a number of CCEs of the second aggregation level.

Aspect 7: The method of any of aspects 1-6, wherein, for a control resource set having N control channel elements (CCEs), a largest permitted starting CCE of the PDCCH candidate is based at least in part on a floor of (N divided by a number of CCEs of the second aggregation level) minus one, multiplied by the number of CCEs of the second aggregation level.

Aspect 8: The method of aspect 7, wherein, if one or more CCEs of the PDCCH candidate occur outside of the control resource set when the largest permitted starting CCE is used, the one or more CCEs are mapped starting at an initial CCE of the control resource set.

Aspect 9: The method of any of aspects 1-6, wherein, for a control resource set having N control channel elements (CCEs), a largest permitted starting CCE of the PDCCH candidate is based at least in part on a floor of (N divided by a number of CCEs of the second aggregation level) minus two, multiplied by the number of CCEs of the second aggregation level.

Aspect 10: The method of any of aspects 1-9, wherein the common DCI schedules a physical downlink shared channel (PDSCH), the PDCCH candidate is a first PDCCH candidate, and the method further comprises: monitoring the first PDCCH candidate and a second PDCCH candidate based at least in part on the common DCI being transmitted in a non-interleaved and one-symbol control resource set, wherein the second PDCCH candidate is associated with a same starting control channel element as the first PDCCH candidate and a larger aggregation level than the first PDCCH candidate, and wherein resources associated with the second PDCCH candidate are not available for the PDSCH.

Aspect 11: The method of any of aspects 1-10, wherein receiving the common DCI further comprises: decoding the common DCI on the part of the PDCCH candidate; and treating, based at least in part on decoding the common DCI on the part of the PDCCH candidate, one or more resources associated with a remainder of the PDCCH candidate, other than the part of the PDCCH candidate, as available for a physical downlink shared channel scheduled by the common DCI.

Aspect 12: The method of any of aspects 1-10, wherein receiving the common DCI further comprises: decoding the common DCI on the part of the PDCCH candidate; and puncturing a physical downlink shared channel scheduled by the common DCI at one or more resources associated with a remainder of the PDCCH candidate other than the part of the PDCCH candidate.

Aspect 13: The method of any of aspects 1-12, wherein the common DCI is associated with a remaining minimum system information block, and wherein the first aggregation level and the second aggregation level are associated with a same maximum allowed number of PDCCH candidates based at least in part on the common DCI being associated with the remaining minimum system information block.

Aspect 14: A method of wireless communication performed by a base station, comprising: mapping common downlink control information (DCI) to a physical downlink control channel (PDCCH) associated with a PDCCH candidate, wherein the PDCCH candidate has a first size associated with a first aggregation level, wherein the common DCI is detectable at the first aggregation level by decoding the PDCCH candidate and detectable at a second aggregation level, smaller than the first aggregation level, by decoding a part of the PDCCH candidate, and wherein the part of the PDCCH candidate has a second size associated with the second aggregation level; and transmitting the common DCI.

Aspect 15: The method of aspect 14, wherein the part of the PDCCH candidate spans a first region of a control resource set (CORESET) and the PDCCH candidate spans the first region and a second region of the CORESET, wherein the first region has a size corresponding to the second size and the second region has a size corresponding to a difference between the first size and the second size.

Aspect 16: The method of aspect 15, wherein the common DCI is rate matched to a collective size of the first region and the second region, and wherein the common DCI is mapped to the first region and to the second region sequentially.

Aspect 17: The method of aspect 15, wherein the common DCI is rate matched to the size of the first region and mapped to the first region, and the common DCI is rate matched to the size of the second region and mapped to the second region.

Aspect 18: The method of aspect 17, wherein a mother polar code associated with the second region is the same as a mother polar code associated with the first region.

Aspect 19: The method of any of aspects 14-18, wherein a starting control channel element (CCE) index of the PDCCH candidate is an integer multiple of a number of CCEs of the second aggregation level.

Aspect 20: The method of any of aspects 14-19, wherein, for a control resource set having N control channel elements (CCEs), a largest permitted starting CCE of the PDCCH candidate is based at least in part on a floor of (N divided by a number of CCEs of the second aggregation level) minus one.

Aspect 21: The method of aspect 20, wherein, if one or more CCEs of the PDCCH candidate occur outside of the control resource set when the largest permitted starting CCE is used, the one or more CCEs are mapped starting at an initial CCE of the control resource set.

Aspect 22: The method of any of aspects 14-21, wherein, for a control resource set having N control channel elements (CCEs), a largest permitted starting CCE of the PDCCH candidate is based at least in part on a floor of (N divided by a number of CCEs of the second aggregation level) minus two.

Aspect 23: The method of any of aspects 14-22, wherein the common DCI schedules a physical downlink shared channel (PDSCH), the PDCCH candidate is a first PDCCH candidate, and the method further comprises: configuring a second PDCCH candidate based at least in part on the common DCI being transmitted in a non-interleaved and one-symbol control resource set, wherein the second PDCCH candidate is associated with a same starting control channel element as the first PDCCH candidate and a larger aggregation level than the first PDCCH candidate, and wherein resources associated with the second PDCCH candidate are not available for the PDSCH.

Aspect 24: The method of any of aspects 14-23, wherein, if the common DCI is decoded on the part of the PDCCH candidate, one or more resources associated with a remainder of the PDCCH candidate, other than the part of the PDCCH candidate, are treated as available for a physical downlink shared channel scheduled by the common DCI.

Aspect 25: The method of any of aspects 14-23, wherein, if the common DCI is decoded on the part of the PDCCH candidate, one or more resources of a physical downlink shared channel scheduled by the common DCI are punctured based at least in part on the one or more resources being associated with a remainder of the PDCCH candidate other than the part of the PDCCH candidate.

Aspect 26: The method of any of aspects 14-25, wherein the common DCI is associated with a remaining minimum system information block, and wherein the first aggregation level and the second aggregation level are associated with a same maximum allowed number of PDCCH candidates based at least in part on the common DCI being associated with the remaining minimum system information block.

Aspect 27: The method any of aspects 14-26, wherein the common DCI is mapped to be detectable at the first aggregation level and at the second aggregation level based at least in part on the common DCI being directed to a reduced capability user equipment associated with the first aggregation level.

Aspect 28: An apparatus for wireless communication at a device, comprising a processor; memory coupled with the processor; and instructions stored in the memory and executable by the processor to cause the apparatus to perform the method of one or more aspects of aspects 1-13.

Aspect 29: A device for wireless communication, comprising a memory and one or more processors coupled to the memory, the memory and the one or more processors configured to perform the method of one or more aspects of aspects 1-13.

Aspect 30: An apparatus for wireless communication, comprising at least one means for performing the method of one or more aspects of aspects 1-13.

Aspect 31: A non-transitory computer-readable medium storing code for wireless communication, the code comprising instructions executable by a processor to perform the method of one or more aspects of aspects 1-13.

Aspect 32: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 33: An apparatus for wireless communication at a device, comprising a processor; memory coupled with the processor; and instructions stored in the memory and executable by the processor to cause the apparatus to perform the method of one or more aspects of aspects 14-27.

Aspect 34: A device for wireless communication, comprising a memory and one or more processors coupled to the memory, the memory and the one or more processors configured to perform the method of one or more aspects of aspects 14-27.

Aspect 35: An apparatus for wireless communication, comprising at least one means for performing the method of one or more aspects of aspects 14-27.

Aspect 36: A non-transitory computer-readable medium storing code for wireless communication, the code comprising instructions executable by a processor to perform the method of one or more aspects of aspects 14-27.

Aspect 37: A non-transitory computer-readable medium storing a set of instructions for wireless communication, the set of instructions comprising one or more instructions that, when executed by one or more processors of a device, cause the device to perform the method of one or more aspects of aspects 14-27.

The foregoing disclosure provides illustration and description, but is not intended to be exhaustive or to limit the aspects to the precise forms disclosed. Modifications and variations may be made in light of the above disclosure or may be acquired from practice of the aspects.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Devices of a wireless network (such as wireless network 100) may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving common downlink control information (DCI) included in a physical downlink control channel (PDCCH) candidate; and communicating based at least in part on the common DCI, wherein the PDCCH candidate has a first size associated with a first aggregation level, wherein the common DCI is detectable at the first aggregation level by decoding of the PDCCH candidate and detectable at a second aggregation level, smaller than the first aggregation level, by decoding of a part of the PDCCH candidate, and wherein the part of the PDCCH candidate has a second size associated with the second aggregation level, and wherein:

the PDCCH candidate spans a first region and a second region of a control resource set (CORE-SET), wherein the part of the PDCCH candidate spans the first region of the CORESET, wherein the first region has a size corresponding to the second size and the second region has a size corresponding to a difference between the first size and the second size; or a starting control channel element (CCE) index of the PDCCH candidate is an integer multiple of a number of CCEs of the second aggregation level.

2. The method of claim 1, wherein the PDCCH candidate spans the first region and the second region of the CORE-SET, wherein the part of the PDCCH candidate spans the first region of the CORESET, wherein the first region has the size corresponding to the second size and the second region has the size corresponding to the difference between the first size and the second size.

3. The method of claim 2, wherein the common DCI is rate matched to a collective size of the first region and the second region, and wherein the common DCI is mapped to the first region and to the second region sequentially.

4. The method of claim 2, wherein the common DCI is rate matched to the size of the first region and mapped to the first region, and the common DCI is rate matched to the size of the second region and mapped to the second region.

5. The method of claim 4, wherein a mother polar code associated with the second region is the same as a mother polar code associated with the first region.

6. The method of claim 1, wherein the starting control channel element (CCE) index of the PDCCH candidate is the integer multiple of the number of CCEs of the second aggregation level.

7. The method of claim 1, wherein the common DCI schedules a physical downlink shared channel (PDSCH), the PDCCH candidate is a first PDCCH candidate, and the method further comprises:

> monitoring the first PDCCH candidate and a second PDCCH candidate based at least in part on the common DCI being transmitted in a non-interleaved and one-symbol control resource set, wherein the second PDCCH candidate is associated with a same starting control channel element as the first PDCCH candidate and a larger aggregation level than the first PDCCH candidate, and wherein resources associated with the second PDCCH candidate are not available for the PDSCH.

8. The method of claim 1, wherein receiving the common DCI further comprises:

> decoding the common DCI on the part of the PDCCH candidate; and
> treating, based at least in part on decoding the common DCI on the part of the PDCCH candidate, one or more resources associated with a remainder of the PDCCH candidate, other than the part of the PDCCH candidate, as available for a physical downlink shared channel scheduled by the common DCI.

9. The method of claim 1, wherein receiving the common DCI further comprises:

> decoding the common DCI on the part of the PDCCH candidate; and
> puncturing a physical downlink shared channel scheduled by the common DCI at one or more resources associated with a remainder of the PDCCH candidate other than the part of the PDCCH candidate.

10. The method of claim 1, wherein the common DCI is associated with a remaining minimum system information block, and wherein the first aggregation level and the second aggregation level are associated with a same maximum allowed number of PDCCH candidates based at least in part on the common DCI being associated with the remaining minimum system information block.

11. A method of wireless communication performed by a user equipment (UE), comprising:

> receiving common downlink control information (DCI) included in a physical downlink control channel (PDCCH) candidate; and
> communicating based at least in part on the common DCI,
> > wherein the PDCCH candidate has a first size associated with a first aggregation level,
> > wherein the common DCI is detectable at the first aggregation level by decoding of the PDCCH candidate and detectable at a second aggregation level, smaller than the first aggregation level, by decoding of a part of the PDCCH candidate, and > > wherein the part of the PDCCH candidate has a second size associated with the second aggregation level, and
> > wherein for a control resource set having N control channel elements (CCEs), a largest permitted starting CCE of the PDCCH candidate is based at least in part on a floor of (N divided by a number of CCEs of the second aggregation level) minus a number that is one or two, multiplied by the number of CCEs of the second aggregation level.

12. The method of claim 11, wherein the number is one.

13. The method of claim 12, wherein, if one or more CCEs of the PDCCH candidate occur outside of the control resource set when the largest permitted starting CCE is used, the one or more CCEs are mapped starting at an initial CCE of the control resource set.

14. The method of claim 11, wherein the number is two.

15. A user equipment (UE) for wireless communication, comprising at least one memory coupled to one or more processors, wherein the one or more processors are configured to cause the UE to:

> receive common downlink control information (DCI) included in a physical downlink control channel (PDCCH) candidate; and
> communicate based at least in part on the common DCI,
> > wherein the PDCCH candidate has a first size associated with a first aggregation level,
> > wherein the common DCI is detectable at the first aggregation level by decoding of the PDCCH candidate and detectable at a second aggregation level, smaller than the first aggregation level, by decoding of a part of the PDCCH candidate, and
> > wherein the part of the PDCCH candidate has a second size associated with the second aggregation level, and
> > wherein:
> > > the PDCCH candidate spans a first region and a second region of a control resource set (CORESET), wherein the part of the PDCCH candidate spans the first region of the CORESET, wherein the first region has a size corresponding to the second size and the second region has a size corresponding to a difference between the first size and the second size; or
> > > a starting control channel element (CCE) index of the PDCCH candidate is an integer multiple of a number of CCEs of the second aggregation level.

16. The UE of claim 15, wherein the PDCCH candidate spans the first region and the second region of the CORESET, wherein the part of the PDCCH candidate spans the first region of the CORESET, wherein the first region has the size corresponding to the second size and the second region has the size corresponding to the difference between the first size and the second size.

17. The UE of claim 16, wherein the common DCI is rate matched to a collective size of the first region and the second region, and wherein the common DCI is mapped to the first region and to the second region sequentially.

18. The UE of claim 16, wherein the common DCI is rate matched to the size of the first region and mapped to the first region, and the common DCI is rate matched to the size of the second region and mapped to the second region.

19. The UE of claim 18, wherein a mother polar code associated with the second region is the same as a mother polar code associated with the first region.

20. The UE of claim 15, wherein the starting control channel element (CCE) index of the PDCCH candidate is the integer multiple of the number of CCEs of the second aggregation level.

21. The UE of claim 15, wherein the common DCI schedules a physical downlink shared channel (PDSCH), the PDCCH candidate is a first PDCCH candidate, and the one or more processors are configured to cause the UE to:

monitor the first PDCCH candidate and a second PDCCH candidate based at least in part on the common DCI being transmitted in a non-interleaved and one-symbol control resource set, wherein the second PDCCH candidate is associated with a same starting control channel element as the first PDCCH candidate and a larger aggregation level than the first PDCCH candidate, and wherein resources associated with the second PDCCH candidate are not available for the PDSCH.

22. The UE of claim 15, wherein to receive the common DCI, the one or more processors are configured to cause the UE to:

decode the common DCI on the part of the PDCCH candidate; and treat, based at least in part on decoding the common DCI on the part of the PDCCH candidate, one or more resources associated with a remainder of the PDCCH candidate, other than the part of the PDCCH candidate, as available for a physical downlink shared channel scheduled by the common DCI.

23. The UE of claim 15, wherein to receive the common DCI, the one or more processors are configured to cause the UE to:

decode the common DCI on the part of the PDCCH candidate; and puncture a physical downlink shared channel scheduled by the common DCI at one or more resources associated with a remainder of the PDCCH candidate other than the part of the PDCCH candidate.

24. The UE of claim 15, wherein the common DCI is associated with a remaining minimum system information block, and wherein the first aggregation level and the second aggregation level are associated with a same maximum allowed number of PDCCH candidates based at least in part on the common DCI being associated with the remaining minimum system information block.

25. A user equipment (UE) for wireless communication, comprising at least one memory coupled to one or more processors, wherein the one or more processors are configured to cause the UE to:

receive common downlink control information (DCI) included in a physical downlink control channel (PDCCH) candidate; and communicate based at least in part on the common DCI, wherein the PDCCH candidate has a first size associated with a first aggregation level, wherein the common DCI is detectable at the first aggregation level by decoding of the PDCCH candidate and detectable at a second aggregation level, smaller than the first aggregation level, by decoding of a part of the PDCCH candidate, and wherein the part of the PDCCH candidate has a second size associated with the second aggregation level, and wherein for a control resource set having N control channel elements (CCEs), a largest permitted starting CCE of the PDCCH candidate is based at least in part on a floor of (N divided by a number of CCEs of the second aggregation level) minus a number that is one or two, multiplied by the number of CCEs of the second aggregation level.

26. The UE of claim 25, wherein the number is one.

27. The UE of claim 26, wherein, if one or more CCEs of the PDCCH candidate occur outside of the control resource set when the largest permitted starting CCE is used, the one or more CCEs are mapped starting at an initial CCE of the control resource set.

28. The UE of claim 25, wherein the number is two.

* * * * *